(12) United States Patent
Gillespie et al.

(10) Patent No.: US 12,202,232 B2
(45) Date of Patent: Jan. 21, 2025

(54) MACHINE DIRECTION-ORIENTED POLYMERIC FILM, AND METHOD OF MAKING THE MACHINE DIRECTION-ORIENTED POLYMERIC FILM

(71) Applicant: BERRY GLOBAL, INC., Evansville, IN (US)

(72) Inventors: Bryan S. Gillespie, Altoona, WI (US); Paul Z. Wolak, Indianapolis, IN (US)

(73) Assignee: BERRY GLOBAL, INC., Evansville, IN (US)

( * ) Notice: Subject to any disclaimer, the term of this patent is extended or adjusted under 35 U.S.C. 154(b) by 0 days.

(21) Appl. No.: 16/669,084

(22) Filed: Oct. 30, 2019

(65) Prior Publication Data

US 2020/0114627 A1    Apr. 16, 2020

Related U.S. Application Data

(63) Continuation of application No. 16/599,689, filed on Oct. 11, 2019.

(60) Provisional application No. 62/797,595, filed on Jan. 28, 2019, provisional application No. 62/745,089, filed on Oct. 12, 2018.

(51) Int. Cl.
| | |
|---|---|
| B32B 27/08 | (2006.01) |
| B32B 15/082 | (2006.01) |
| B32B 27/28 | (2006.01) |
| B32B 27/32 | (2006.01) |
| B32B 27/36 | (2006.01) |

(52) U.S. Cl.
CPC ............ *B32B 27/08* (2013.01); *B32B 15/082* (2013.01); *B32B 27/28* (2013.01); *B32B 27/32* (2013.01); *B32B 27/36* (2013.01); *B32B 2307/72* (2013.01); *B32B 2323/046* (2013.01)

(58) Field of Classification Search
CPC ........... B32B 27/32; B32B 1/00; B32B 27/08; B32B 2307/31; B32B 2323/046; B32B 27/306; B32B 2331/04; B32B 2307/54; B32B 2270/00
See application file for complete search history.

(56) References Cited

U.S. PATENT DOCUMENTS

| | | |
|---|---|---|
| 2,699,457 A | 1/1955 | Ziegler |
| 2,862,917 A | 12/1955 | Anderson |
| 2,905,645 A | 9/1959 | Anderson |
| 3,058,963 A | 10/1962 | Vandenberg |
| 4,216,132 A | 8/1980 | Himes |

(Continued)

FOREIGN PATENT DOCUMENTS

| | | |
|---|---|---|
| EP | 1529631 A1 | 5/2005 |
| EP | 1537175 B1 | 5/2008 |

(Continued)

OTHER PUBLICATIONS

Third Party Submission for U.S. Appl. No. 16/669,084 dated May 4, 2020, BP-532 US-U ǁ 121 pages.

(Continued)

*Primary Examiner* — Samir Shah
(74) *Attorney, Agent, or Firm* — Barnes & Thornburg LLP

(57) ABSTRACT

Machine direction-oriented polymeric films include a polyolefin and a nucleating agent. Methods for forming polymeric films and articles of manufacture prepared therefrom are described.

18 Claims, 3 Drawing Sheets

(56) References Cited

U.S. PATENT DOCUMENTS

| | | | |
|---|---|---|---|
| 4,668,752 A | 5/1987 | Tominari | |
| 4,863,784 A * | 9/1989 | Lustig | B32B 27/32 |
| | | | 428/218 |
| 5,399,426 A | 3/1995 | Koch | |
| 6,265,055 B1 | 7/2001 | Simpson | |
| 6,391,411 B1 | 5/2002 | Duckwall, Jr. | |
| 6,803,113 B2 | 10/2004 | Porter | |
| 6,903,162 B2 | 6/2005 | Nygard | |
| 6,984,695 B2 | 1/2006 | Brown | |
| 7,201,966 B2 | 4/2007 | Lischefski | |
| 7,504,142 B2 | 3/2009 | Harvey | |
| 7,608,327 B2 | 10/2009 | Mavridis | |
| 7,659,343 B2 | 2/2010 | Wooster | |
| 7,799,418 B2 | 9/2010 | Champion | |
| 7,820,271 B2 | 10/2010 | Rasmussen | |
| 8,057,718 B2 | 11/2011 | Lee | |
| 8,122,638 B2 | 2/2012 | Chevalier | |
| 8,207,265 B2 | 6/2012 | McGee | |
| 8,227,546 B2 | 7/2012 | Parkinson | |
| 8,399,581 B2 | 3/2013 | Farley | |
| 9,067,391 B2 | 6/2015 | Lu | |
| 9,102,128 B2 | 8/2015 | Manrique | |
| 9,296,182 B2 | 3/2016 | Vinck | |
| 9,382,454 B2 | 7/2016 | Suzuki | |
| 9,505,195 B2 | 11/2016 | Masaki | |
| 9,630,385 B2 | 4/2017 | Moritz | |
| 9,662,867 B2 | 5/2017 | Damman | |
| 9,669,591 B2 | 6/2017 | Koehn | |
| 9,815,266 B2 | 11/2017 | Rasmussen | |
| 9,821,542 B2 | 11/2017 | Bruce | |
| 9,896,574 B2 | 2/2018 | Bafna | |
| 9,950,501 B2 | 4/2018 | Roussos | |
| 10,040,261 B2 | 8/2018 | McLeod | |
| 10,052,844 B2 | 8/2018 | Dorsey | |
| 10,357,913 B2 | 7/2019 | Dou | |
| 10,525,678 B2 | 1/2020 | Zaikov | |
| 10,926,518 B2 | 2/2021 | Garzitto | |
| RE48,555 E | 5/2021 | Cancio | |
| 11,180,644 B2 | 11/2021 | Cheng | |
| 11,220,034 B2 | 1/2022 | Sontag | |
| 11,407,160 B2 | 8/2022 | Borse | |
| 11,459,488 B2 | 10/2022 | Blackwell | |
| 11,472,166 B2 | 10/2022 | Ackermans | |
| 11,718,079 B2 | 8/2023 | Ambroise | |
| 2003/0211350 A1* | 11/2003 | Migliorini | B32B 27/32 |
| | | | 428/500 |
| 2004/0146226 A1 | 7/2004 | Wolak | |
| 2005/0054800 A1 | 3/2005 | Tau | |
| 2005/0175803 A1 | 8/2005 | Breese | |
| 2005/0200046 A1 | 9/2005 | Breese | |
| 2005/0287378 A1 | 12/2005 | Klein | |
| 2005/0287380 A1 | 12/2005 | Klein | |
| 2005/0287381 A1 | 12/2005 | Peiffer | |
| 2006/0135698 A1 | 6/2006 | Mier | |
| 2006/0243842 A1 | 11/2006 | Saldana Garcia | |
| 2006/0263596 A1 | 11/2006 | Bamborough | |
| 2007/0031690 A1 | 2/2007 | Busche | |
| 2008/0118749 A1† | 5/2008 | Aubee | |
| 2008/0226207 A1* | 9/2008 | Frayne | B65D 33/01 |
| | | | 383/109 |
| 2008/0299364 A1* | 12/2008 | Nilsen | B32B 27/08 |
| | | | 428/213 |
| 2009/0035545 A1 | 2/2009 | Guenther | |
| 2009/0130408 A1 | 5/2009 | Mathe | |
| 2009/0191371 A1 | 7/2009 | Uradnisheck | |
| 2010/0009156 A1 | 1/2010 | Daviknes | |
| 2010/0040875 A1 | 2/2010 | Patel | |
| 2010/0129652 A1 | 5/2010 | McLeod | |
| 2010/0304062 A1 | 12/2010 | Daviknes | |
| 2011/0003099 A1 | 1/2011 | Vinck | |
| 2011/0008603 A1 | 1/2011 | Ellingson | |
| 2011/0048635 A1 | 3/2011 | Bernhard | |
| 2011/0300391 A1† | 12/2011 | Haley | |
| 2014/0335293 A1 | 11/2014 | Schuhmann | |
| 2015/0132515 A1 | 5/2015 | Hernandez | |
| 2016/0031191 A1* | 2/2016 | Paulino | B32B 27/08 |
| | | | 428/220 |
| 2016/0229157 A1 | 8/2016 | Clare | |
| 2016/0229158 A1† | 8/2016 | Cavacas | |
| 2016/0260360 A1 | 9/2016 | Ueda | |
| 2016/0318290 A1 | 11/2016 | Su | |
| 2016/0339663 A1 | 11/2016 | Clare | |
| 2017/0129228 A1 | 5/2017 | Middlesworth | |
| 2017/0274574 A1† | 9/2017 | Borse | |
| 2018/0148614 A1 | 5/2018 | Schuhmann | |
| 2018/0171125 A1 | 6/2018 | Fellahi | |
| 2019/0270288 A1 | 9/2019 | Dabadie | |
| 2019/0366695 A1 | 12/2019 | Lee | |
| 2020/0122439 A1 | 4/2020 | Grefenstein | |
| 2020/0299043 A1 | 9/2020 | Drori | |
| 2021/0023828 A1 | 1/2021 | Yamada | |
| 2021/0291503 A1 | 9/2021 | Berbert | |
| 2022/0072839 A1 | 3/2022 | Lee | |
| 2023/0014793 A1 | 1/2023 | Farkas | |
| 2023/0082689 A1 | 3/2023 | Niedersüss | |
| 2023/0174691 A1 | 6/2023 | Chambliss | |

FOREIGN PATENT DOCUMENTS

| | | |
|---|---|---|
| EP | 4053194 A1 | 9/2022 |
| EP | 4072856 A1 | 10/2022 |
| WO | 2003095201 | 11/2003 |
| WO | 2006073812 | 7/2006 |
| WO | 2012093881 A2 | 7/2012 |
| WO | 2014160044 | 10/2014 |
| WO | 2016088045 A1 | 6/2016 |
| WO | 2016200363 | 12/2016 |
| WO | 2020067426 A1 | 4/2020 |
| WO | 2021020558 A1 | 2/2021 |
| WO | 2022009989 A1 | 1/2022 |
| WO | 2022038907 A1 | 2/2022 |
| WO | 2022092296 A1 | 5/2022 |
| WO | 2022210058 A1 | 10/2022 |
| WO | 2023028432 A1 | 3/2023 |
| WO | 2023033158 A1 | 3/2023 |
| WO | 2023033159 A1 | 3/2023 |

OTHER PUBLICATIONS

Hanson, A., "A National Measurement Good Practice Guide No. 94, Good Practice Guide for the Measurement of Gloss", Published 2006, National Physical Laboratory, 86 pages.

International (PCT) Search Report and Written Opinion for PCT/US20/16118 daetd Apr. 28, 2020, BP-533 PCT || 10 pages.

Cooper, "Microanalysis of Polymer Chain Diffusion in Heat Seals" 2015; Clemson University thesis; p. 72, last paragraph, p. 102, Fig. 60.

Songhan Plastic Technology, "Total PPR 8473 Polypropylene, Film Extrusion Grade", Sep. 24, 2014; downloaded Mar. 25, 2020: http://www.matweb.com/search/datasheettext.aspx?matguid=dbf0f8c17c3444908e6e81d07b4e546c.

Third Party Submission for U.S. Appl. No. 16/599,689 dated Aug. 19, 2020, BP-532 US-U || 25 pages.

Li, D. et al., "Effect of Crystallinity of Polyethylene with Different Densities on Breakdown Strength and Conductance Property," pp. 1-13, Materials 2019, 12, 1746, published May 29, 2019.

International (PCT) Search Report and Written Opinion for PCT/US19/55897, dated Dec. 18, 2019, BP-532 PCT || 10 pages.

The Wiley Encyclopedia of Packaging Technology, pp. 233-238, 748-750, 753-754 (Aaron L. Brody et al. eds., 2nd Ed. 1997), 13 pages.

Kirk-Othmer Concise Encyclopedia of Chemical Technology, pp. 1420-1421 (Jacqueline I. Kroschwitz et al. eds., 4th (Ed. 1999), 4 pages.

ASTM International, "Standard Test Method for Seal Strength of Flexible Barrier Materials," F88-00, 6 pages.

ASTM International, "Standard Practices for Making Heatseals for Determination of Heatsealability of Flexible Webs as Measured by Seal Strength," F2029-00, 9 pages.

(56) References Cited

OTHER PUBLICATIONS

Tavor, "Tosaf's new MT7636PE delivers matte effect on polyolefin films without additional converting process" Oct. 28, 2018, available at https://packagingpla.net/tosafs-new-mt7636pe-delivers-matte-effect-on-polyolefin-films-without-additional-converting-process/, 4 pages.
Office Action dated Nov. 12, 2020 for U.S. Appl. No. 16/778,516, BP-533 US-U II (pp. 1-7).
Office Action dated Sep. 16, 2021 for U.S. Appl. No. 16/599,689, BP-532 US-U II (pp. 1-10).
Office Action dated Sep. 27, 2021 for U.S. Appl. No. 16/778,516, BP-533 US-U II (pp. 1-10).
Hanschen T P. (Films, orientation. Encyclopedia of polymer science and Technology, Oct. 2001). (Year: 2001), 19 pages.
Office Action (Final Rejection) dated Dec. 29, 2021 for U.S. Appl. No. 16/599,689, BP-532 US-U II (pp. 1-12).
Office Action (Non-Final Rejection) dated Jan. 19, 2023 for U.S. Appl. No. 16/599,689 (pp. 1-11).
Office Action (Final Rejection) dated Feb. 2, 2022 for U.S. Appl. No. 16/778,516 , BP-533 US-US II (pp. 1-9).
Office Action (Final Rejection) dated Oct. 2, 2023 for U.S. Appl. No. 16/778,516 (pp. 1-11).
Office Action (Final Rejection) dated Aug. 21, 2023 for U.S. Appl. No. 16/599,689, BP-532 US-U II (pp. 1-11).
Office Action (Non-Final Rejection) dated May 10, 2023 for U.S. Appl. No. 16/778,516, BP-533 US-U II (pp. 1-10).
Office Action (Non-Final Rejection) dated Oct. 24, 2024 for U.S. Appl. No. 16/599,689, BP-532 US-U II (pp. 1-10).
Canadian Examination Report for Canadian Patent App. No. CA3,129,515 established 19 Sep. 24, BP-533 CA II , 5 pages.
Hanson, A., "A National Measurement Good Practice Guide No. 94, Good Practice Guide for the Measurement of Gloss", Published 2006, National Physical Laboratory.†

\* cited by examiner
† cited by third party

US 12,202,232 B2

MACHINE DIRECTION-ORIENTED POLYMERIC FILM, AND METHOD OF MAKING THE MACHINE DIRECTION-ORIENTED POLYMERIC FILM

RELATED APPLICATIONS

This application is a Continuation of U.S. patent application Ser. No. 16/599,689, filed Oct. 11, 2019, which claims the benefit of U.S. Provisional Application No. 62/797,595, filed Jan. 28, 2019, and U.S. Provisional Application No. 62/745,089, filed Oct. 12, 2018. The entire contents of the referenced applications are incorporated herein by reference, except that in the event of any inconsistent disclosure or definition from the present specification, the disclosure or definition herein shall be deemed to prevail.

BACKGROUND

The present disclosure relates to polymeric materials, and particularly to polymeric films. More particularly, the present disclosure relates to polymeric films formed from polymeric material.

SUMMARY

According to the present disclosure, a machine direction-oriented polymeric film is made using a manufacturing process. The manufacturing process comprises the step of stretching a pre-heated multi-layer film to form the machine direction-oriented polymeric film.

In illustrative embodiments, the machine direction-oriented polymeric film has a strain at break in a machine direction of less than about 300%, a 45 degree gloss of greater than about 30%, and a haze of less than about 30%.

In illustrative embodiments, the machine direction-oriented polymeric film comprises a first skin layer comprising polyethylene and a nucleating agent, a core layer comprising polyethylene, and a second skin layer comprising polyethylene.

In other illustrative embodiments, the machine direction-oriented polymeric film comprises a first skin layer comprising polyethylene, a core layer comprising an oxygen barrier polymer, and a second skin layer comprising polyethylene.

In illustrative embodiments, a packaging article comprises a machine direction-oriented polymeric film and a sealant web laminated thereto. In other illustrative embodiments, a packaging article comprises a machine direction-oriented polymeric film and a barrier film laminated thereto.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
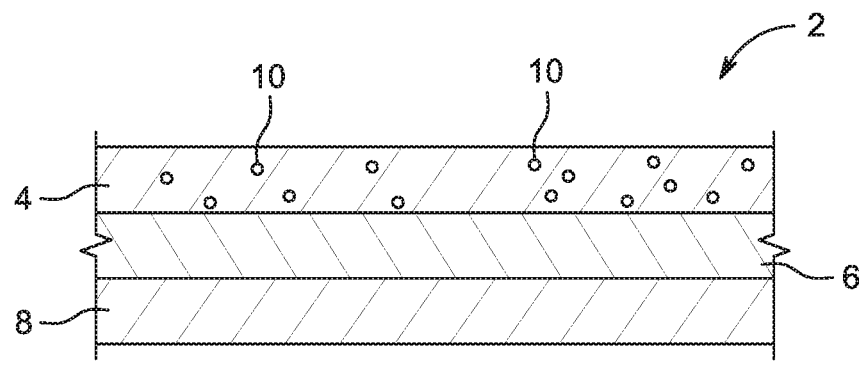
FIG. 1 is a diagrammatic view of a representative embodiment of a machine direction-oriented polymeric film that includes three layers.

In illustrative embodiments, the present disclosure provides a formulation for making a precursor film, which can be stretched via machine direction orientation (MDO) to provide a polymeric film having reduced gauge, high stiffness, low elongation, low haze, and/or high gloss. In illustrative embodiments, the machine-direction oriented polymeric film thus produced may be used as a print web. In illustrative embodiments, the formulation for making the precursor film includes a minimum of (a) a first skin layer containing high density polyethylene (HDPE) and/or medium density polyethylene (MDPE) and/or linear medium density polyethylene (LMDPE) and/or linear low density polyethylene (LLDPE) and/or any polyethylene configured to provide the requisite degree of heat resistance for a given application, (b) a core layer containing polyethylene, and (c) a second skin layer containing high density polyethylene (HDPE) and/or medium density polyethylene (MDPE) and/or linear medium density polyethylene (LMDPE) and/or linear low density polyethylene (LLDPE) and/or any polyethylene configured to provide the requisite degree of heat resistance for a given application. In other illustrative embodiments, the formulation for making the precursor film includes a minimum of a first skin layer containing high density polyethylene (HDPE) and/or medium density polyethylene (MDPE) and/or linear medium density polyethylene (LMDPE) and/or linear low density polyethylene (LLDPE), a first tie layer containing a first tie resin, a core layer containing an oxygen barrier polymer, a second tie layer containing a second tie resin, and a second skin layer containing polyethylene. Using a draw ratio of greater than about 5:1 in an MDO process—in illustrative embodiments between about 5:1 and about 12:1—permits reduction of the gauge of the polymeric film to below 1.50 mils and, in illustrative embodiments, to below 1 mil.

In illustrative embodiments, an MD-oriented polymeric film in accordance with the present disclosure has one or more of the following properties: a strain at break in a machine direction (i.e., elongation) of less than about 300% (in some embodiments, less than about 100%, and in other embodiments less than about 60%), a haze of less than about 30 percent, a 45 degree gloss of greater than about 30 percent, a stress at break in the machine direction of greater than about 10,000 pounds per square inch (psi), good heat resistance allowing for strong seal formation in packaging applications, or a combination thereof. The low extensibility (elongation) of the resultant polymeric film facilitates printing onto the film with high accuracy (e.g., by keeping repeats more stable, minimizing stretching of print, and the like). In addition, the low extensibility of the resultant polymer film facilitates lamination of the film to other surfaces (e.g., by facilitating a lie-flat configuration of the film, minimizing undesirable curl, minimizing structural defects caused by adhesive smear, and the like). In illustrative embodiments, a polyethylene-containing polymeric film in accordance with the present disclosure may be advantageously used in recyclable packaging.

A first embodiment of a multi-layered, machine direction-oriented polymeric film 2 in accordance with the present disclosure is shown, for example, in FIG. 1. The machine direction-oriented polymeric film 2 has, at a minimum, a three-layer structure that includes a first skin layer 4, a second skin layer 8, and a core layer 6 interposed between the first skin layer 4 and the second skin layer 8. Each of the first skin layer 4, the second skin layer 8, and the core layer 6 may include a thermoplastic polymer (or combination of thermoplastic polymers) which, in illustrative embodiments, includes polyethylene. The choice of the thermoplastic polymer or combination of thermoplastic polymers in each of the first skin layer 4, the second layer 8, and the core layer 6 is independent of the other layers. However, in some embodiments, the first skin layer 4 includes high density polyethylene, medium density polyethylene, linear medium density polyethylene, linear low density polyethylene, or a combination thereof. In illustrative embodiments, the first skin layer 4 includes high density polyethylene. In some embodiments, the second skin layer 8 also includes high density polyethylene. In further embodiments, each of the first skin layer 4, the second skin layer 8, and the core layer 6 includes high density polyethylene.

In illustrative embodiments, as shown in FIG. 1, the first skin layer 4 optionally further includes a nucleating agent 10 dispersed therein. In some embodiments, one or both of the second skin layer 8 and the core layer 6 also contains a nucleating agent (not shown) dispersed therein. As used herein, the phrase "nucleating agent" refers to the clarifying agents of a type routinely used in semi-crystalline polymer systems to increase the rate of crystallization. These agents may be added to increase the degree of crystallinity and lamellae thickness and also to improve optical properties. All manner of nucleating agents are contemplated for use in accordance with the present disclosure, including but not limited to the polyethylene clarifying agents sold under the tradename HYPERFORM HPN-20E by Milliken Chemical (Spartanburg, SC). In illustrative embodiments, the nucleating agent includes a compound having a formula I

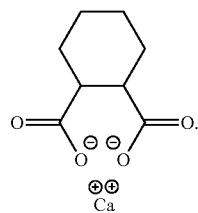

The amount of nucleating agent may be varied based on a desired end use (e.g., the desired optical properties of the machine direction-oriented polymeric film 2). In illustrative embodiments, a nucleating agent may be provided in an amount that is between about 0.1% and about 7% by weight of the layer that contains it. For example, as shown in FIG. 1, the nucleating agent 10 may be provided in an amount from about 0.1% to about 7% by weight of the first skin layer 4.

A precursor substrate film (i.e., a film prior to MDO) containing one or a combination of thermoplastic polymers and, optionally, a nucleating agent dispersed in one or more layers of the film may be produced by either a cast film process or a blown film process. In one example, a precursor substrate film to be stretched via MDO to form a machine direction-oriented polymeric film 2 in accordance with the present disclosure is formed via a blown film process. In another example, the precursor substrate film is formed via a cast film process. The cast film process involves the extrusion of molten polymers through an extrusion die to form a thin film, which is then pinned to the surface of a chill roll.

In one example, a machine direction-oriented polymeric film in accordance with the present disclosure may be manufactured by feed block coextrusion. In another example, a machine direction-oriented polymeric film in accordance with the present disclosure may be made by blown film (tubular) coextrusion. Methods for feed block and blown film extrusion are described in *The Wiley Encyclopedia of Packaging Technology*, pp. 233-238 (Aaron L. Brody et al. eds., 2nd Ed. 1997), which is incorporated herein by reference, except that in the event of any inconsistent disclosure or definition from the present specification, the disclosure or definition herein shall be deemed to prevail. Methods for film extrusion are also described in U.S. Pat. No. 6,265,055, the entire contents of which are likewise incorporated by reference herein, except that in the event of any inconsistent disclosure or definition from the present specification, the disclosure or definition herein shall be deemed to prevail.

Figure 2:
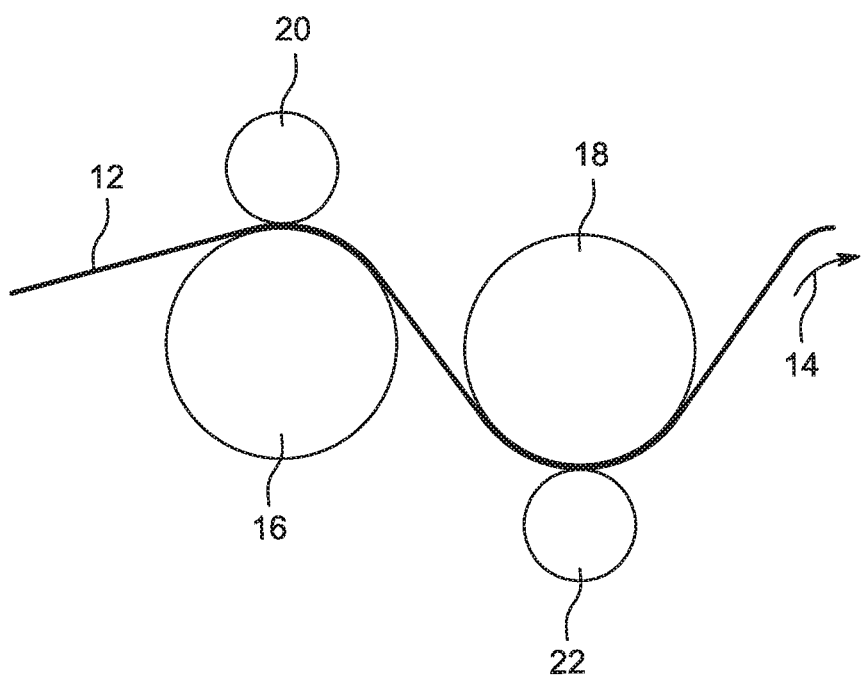
FIG. 2 is a diagrammatic view of an exemplary process for machine direction (MD) stretching of a polymeric film.

The precursor substrate film thus produced may then be stretched via machine direction (MD) orientation by a process analogous to that shown in simplified schematic form in FIG. 2 in order to form a machine direction-oriented polymeric film in accordance with the present disclosure. For example, the film 12 shown in FIG. 2 may be passed between at least two pairs of rollers in the direction of an arrow 14. In this example, first roller 16 and a first nip 20 run at a slower speed ($V_1$) than the speed ($V_2$) of a second roller 18 and a second nip 22. The ratio of $V_2/V_1$ determines the degree to which the film 14 is stretched. Since there may be enough drag on the roll surface to prevent slippage, the process may alternatively be run with the nips open. Thus, in the process shown in FIG. 2, the first nip 20 and the second nip 22 are optional.

A precursor substrate film containing one or more thermoplastic polymers (in illustrative embodiments, one or more types of polyethylene) and, optionally, a nucleating agent dispersed in one or more layers of the precursor substrate film that is subsequently stretched to form a machine direction-oriented polymeric film 2 in accordance with the present disclosure may be prepared by any suitable film-forming process presently known in the art or as yet to be developed. For example, the precursor substrate film may be manufactured by casting or extrusion using blown-film, coextrusion, or single-layer extrusion techniques and/or the like. In one example, the precursor substrate film may be wound onto a winder roll for subsequent stretching in accordance with the present disclosure. In another example, the precursor substrate film may be manufactured in-line with a film stretching apparatus. Prior to stretching, the precursor substrate film may have an initial thickness of between about 2 mil and about 15 mil. In one example, the precursor substrate film has an initial thickness of about 7 mil.

Although the representative example of a machine direction-oriented polymeric film 2 shown in FIG. 1 includes three layers, it is to be understood that the total number of layers in a polymeric film in accordance with the present disclosure is not restricted. Depending on the equipment available for the extrusion, one or more additional layers may likewise be provided between the first skin layer 4 and the core layer 6 and/or between the second skin layer 8 and the core layer 6 of the structure 2 shown in FIG. 1. In some embodiments, 1 to 4 additional layers may be provided between the first skin layer 4 and the core layer 6 and/or between the second skin layer 8 and the core layer 6 of the structure 2 shown in FIG. 1. In some embodiments, a machine direction-oriented polymeric film in accordance with the present disclosure may contain three, five, seven, nine, eleven, or more total layers. An example of a representative five-layer structure is given below.

Figure 3:
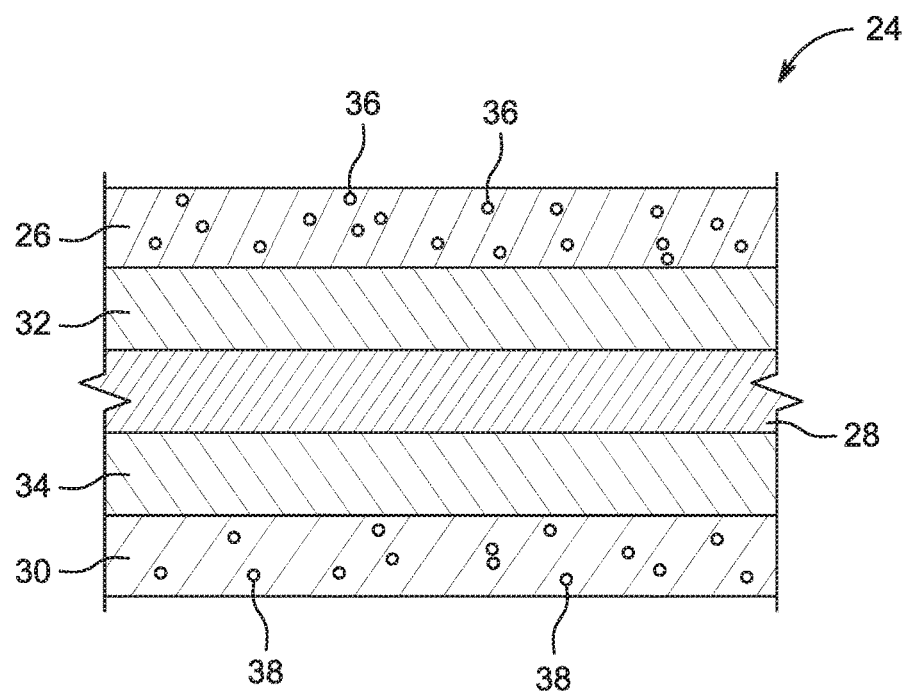
FIG. 3 is a diagrammatic view of a representative embodiment of a machine direction-oriented polymeric film that includes five layers.

A second embodiment of a machine direction-oriented polymeric film 24 in accordance with the present disclosure is shown in FIG. 3. The machine direction-oriented polymeric film 24 has a five-layer structure and includes a first skin layer 26, a core layer 28, a second skin layer 30, a first sub-skin layer 32 interposed between the first skin layer 26 and the core layer 28, and a second sub-skin layer 34 interposed between the second skin layer 30 and the core layer 28. Each of the first skin layer 26, the second skin layer 30, the core layer 28, the first sub-skin layer 32, and the second sub-skin layer 34 may include a thermoplastic polymer (or combination of thermoplastic polymers) which, in illustrative embodiments, includes polyethylene. The choice of the thermoplastic polymer or combination of thermoplastic polymers in each of the first skin layer 26, the second skin layer 30, the core layer 28, the first sub-skin layer 32, and the second sub-skin layer 34 is independent of the other layers. However, in some embodiments, the first skin layer 26 includes high density polyethylene, medium density polyethylene, linear medium density polyethylene, linear low density polyethylene, or a combination thereof. In illustrative embodiments, the first skin layer 26 includes high density polyethylene. In some embodiments, the second skin layer 30 also includes high density polyethylene. In further embodiments, each of the first skin layer 26, the second skin layer 30, and the core layer 28 includes high density polyethylene. In illustrative embodiments, each of the first sub-skin layer 32 and the second sub-skin layer 34 includes low density polyethylene and/or medium density polyethylene. In illustrative embodiments, each of the first sub-skin layer 32 and the second sub-skin layer 34 includes linear low density polyethylene and/or linear medium density polyethylene. In illustrative embodiments, each of the first sub-skin layer 32 and the second sub-skin layer 34 includes metallocene linear medium density polyethylene.

In some embodiments of the five-layered machine direction-oriented polymeric film 24, each of the first skin layer 26 and the second skin layer 30 independently includes from about 5% to about 45% by weight of the machine direction-oriented polymeric film, in other embodiments from about 10% to about 40%. In some embodiments of the five-layered machine direction-oriented polymeric film 24, each of the first sub-skin layer 32 and the second sub-skin layer 34 independently includes from about 3% to about 25% by weight of the machine direction-oriented polymeric film, in other embodiments from about 5% to about 20%. In some embodiments of the five-layered machine direction-oriented polymeric film 24, the core layer 28 includes from about 10% to about 80% by weight of the machine direction-oriented polymeric film, in other embodiments from about 10% to about 60%. In some embodiments of the five-layered machine direction-oriented polymeric film 24, the first skin layer 26, the first sub-skin layer 32, the core layer 28, the second sub-skin layer 34, and the second skin layer 30 are provided, respectively, in an amount of 15/15/40/15/15 by weight of the machine direction-oriented polymeric film. In other embodiments, the first skin layer 26, the first sub-skin layer 32, the core layer 28, the second sub-skin layer 34, and the second skin layer 30 are provided, respectively, in an amount of 33/10/14/10/33 by weight of the machine direction-oriented polymeric film. In further embodiments of the five-layered machine direction-oriented polymeric film 24, the first skin layer 26, the first sub-skin layer 32, the core layer 28, the second sub-skin layer 34, and the second skin layer 30 are provided, respectively, in an amount of 15/30/10/30/15 by weight of the machine direction-oriented polymeric film. In still further embodiments of the five-layered machine direction-oriented polymeric film 24, the first skin layer 26, the first sub-skin layer 32, the core layer 28, the second sub-skin layer 34, and the second skin layer 30 are provided, respectively, in an amount of 15/20/30/20/15 by weight of the machine direction-oriented polymeric film.

In illustrative embodiments, as shown in FIG. 3, the first skin layer 26 optionally further includes a nucleating agent 36 dispersed therein. In some embodiments, one or both of the second skin layer 30 and the core layer 28 also contains a nucleating agent dispersed therein, which may be the same as or different than the nucleating agent dispersed in the first skin layer 26. For example, as shown in FIG. 3, a second nucleating agent 38 is dispersed in the second skin layer 30. The second nucleating agent 38 may be identical to or different than the nucleating agent 36 dispersed in the first skin layer 26.

In some embodiments, a multi-layered, machine direction-oriented polymeric film in accordance with the present disclosure is configured to have oxygen barrier properties (e.g., contains at least one layer—including but not limited to a core layer—that includes an oxygen barrier polymer). Examples of representative oxygen-barrier, machine direction-oriented polymeric films are described below in reference to FIGS. 4 and 5.

Figure 4:
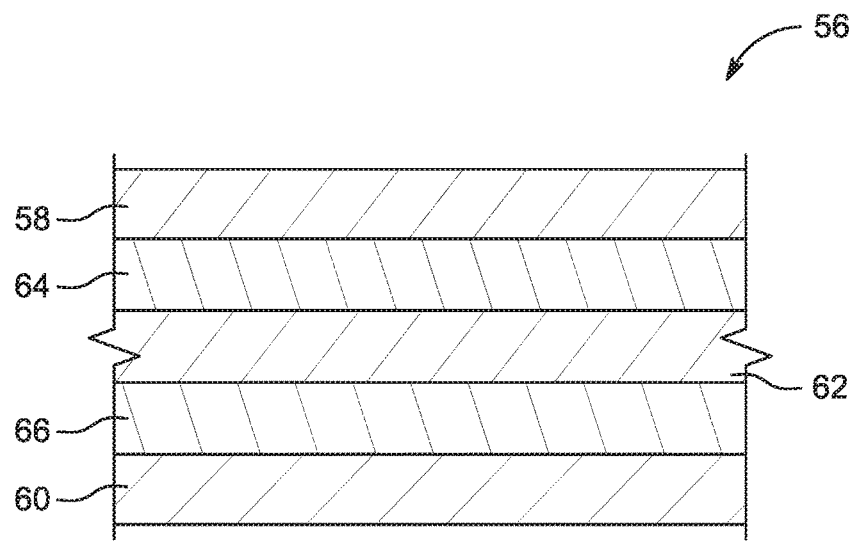
FIG. 4 is a diagrammatic view of a representative embodiment of a machine direction-oriented polymeric film that includes five layers and has oxygen barrier properties.

A first embodiment of a multi-layered, machine direction-oriented polymeric film 56 having oxygen barrier properties in accordance with the present disclosure is shown, for example, in FIG. 4. The machine direction-oriented polymeric film 56 has, at a minimum, a five-layer structure that includes a first skin layer 58, a second skin layer 60, a core layer 62, a first tie layer 64 interposed between the first skin layer 58 and the core layer 62, and a second tie layer 66 interposed between the second skin layer 60 and the core layer 62. Each of the first skin layer 58 and the second skin layer 60 may include a thermoplastic polymer (or combination of thermoplastic polymers) which, in illustrative embodiments, includes polyethylene. The choice of the thermoplastic polymer or combination of thermoplastic polymers in each of the first skin layer 58 and the second skin layer 60 is independent of the other layers. However, in some embodiments, the first skin layer 58 includes high density polyethylene, medium density polyethylene, linear medium density polyethylene, linear low density polyethylene (LLDPE), or a combination thereof. In illustrative embodiments, the first skin layer 58 includes high density polyethylene. In some embodiments, the second skin layer 60 also includes high density polyethylene. The core layer 62 may include an oxygen barrier polymer that includes ethylene vinyl alcohol (EVOH), a polyamide, a polyester, or polyvinylidene chloride. In illustrative embodiments, the core layer 62 includes ethylene vinyl alcohol (EVOH).

Multi-layer films containing adjacent layers of dissimilar materials (e.g., polyethylene and EVOH) are prone to delamination and may exhibit poor physical properties as a result. To minimize or prevent this tendency, a tie layer containing a tie resin may be interposed between the adjacent layers of dissimilar materials. For example, to improve adhesion between a polyethylene-containing layer (e.g., the first skin layer 58 and/or the second skin layer 60 in FIG. 4) and an adjacent oxygen-barrier polymer-containing layer (e.g., the core layer 62 in FIG. 4), an intervening tie layer containing an adhesive polymer or tie resin may be used. In illustrative embodiments, as shown in FIG. 4, the first tie layer 64 is interposed between the HDPE-containing first skin layer 58 and the EVOH-containing core layer 62, and the second tie layer 66 is interposed between the polyethylene-containing second skin layer 60 (in some embodiments, the HDPE-containing second skin layer 60) and the EVOH-containing core layer 62. Each of the first tie layer 64 and the second tie layer 66 independently includes a tie resin, which may be the same as one another or different, and which may be selected based on the specific oxygen barrier polymer contained in the core layer 62. Representative tie resins for use in accordance with the present disclosure include but are not limited to ethylene vinyl acetate (EVA), ethylene methyl acrylate (EMA), ethylene acrylic acid (EAA), ethylene methacrylic acd (EMAA), ethylene-grafted-maleic anhydride (AMP), and the like. In illustrative embodiments, the core layer 62 contains ethylene vinyl alcohol (EVOH), and each of the first tie layer 64 and the second tie layer 66 includes an anhydride-modified polyethylene or a copolymer thereof. In addition to a tie resin, each of the first tie layer 64 and the second tie layer 66 may further include a thermoplastic polymer (e.g., a polyethylene) which, in illustrative embodiments, includes metallocene linear low density polyethylene (mLLDPE).

Although the representative example of a machine direction-oriented polymeric film 56 having oxygen barrier properties shown in FIG. 4 includes a minimum of five layers, it is to be understood that the total number of layers in a polymeric film having oxygen barrier properties in accordance with the present disclosure is not restricted. Depending on the equipment available for the extrusion, one or more additional layers may likewise be provided between the first skin layer 58 and the core layer 62 and/or between the second skin layer 60 and the core layer 62 of the structure 56 shown in FIG. 4. In some embodiments, 1 to 4 additional layers may be provided between the first skin layer 58 and the core layer 62 and/or between the second skin layer 60 and the core layer 62 of the structure 56 shown in FIG. 4. In some embodiments, a machine direction-oriented polymeric film having oxygen barrier properties in accordance with the present disclosure may contain seven, nine, eleven, or more total layers. Similarly, although the representative example of a machine direction-oriented polymeric film 56 having oxygen barrier properties shown in FIG. 4 includes a minimum of five layers, a three-layer version of the polymeric film 56 is contemplated in which the first tie layer 64 and the second tie layer 64 are omitted from the structure and a tie resin (e.g., about 15% by weight) is incorporated directly into each of the first skin layer 58 and the second skin layer 60.

In illustrative embodiments, as noted above, a polyethylene-containing polymeric film in accordance with the present disclosure may be advantageously used in recyclable packaging. However, when two or more polymers (e.g., polyethylene and EVOH) are blended together, either as recycle streams or in other blends and alloys, the polymers may not be compatible with one another, thereby resulting in blends with inadequate properties and characteristics to make them suitable for recycling. To address this problem, functional additives known as compatibilizers may be used to improve the compatibility of the different polymeric materials. While neither desiring to be bound by any particular theory nor intending to limit in any measure the scope of the appended claims or their equivalents, it is presently believed that the use of a compatibilizing resin acts to reduce interfacial energy between two different polymers in order to increase adhesion and/or to enhance the dispersion of the polar polymers into the polyolefin matrix, such that the haze of the resulting structure is minimized. The use of a compatibilizing resin may result in a finer dispersion as well as more regular and stable morphologies.

In order to render a polymeric film that contains an oxygen barrier film (e.g., EVOH) in accordance with the present disclosure recyclable, a compatibilizing resin is used to facilitate the secondary processing and breakdown of the oxygen barrier polymer. Thus, in illustrative embodiments, the machine direction-oriented polymeric film 56 shown in FIG. 4 may further include one or more compatibilizing layers in its structure, each of which layers contains a compatibilizing resin. An example of a representative nine-layer structure containing compatibilizing layers is described below in reference to FIG. 5.

Figure 5:
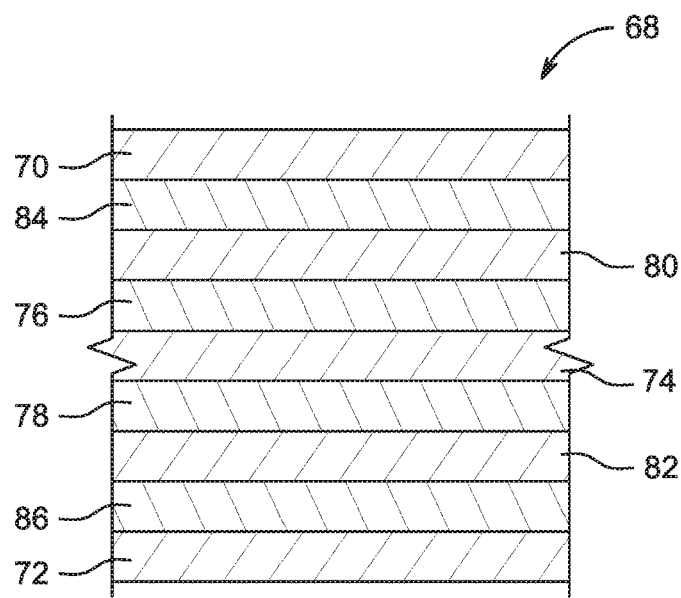
FIG. 5 is a diagrammatic view of a representative embodiment of a machine direction-oriented polymeric film that includes nine layers and has oxygen barrier properties.

A machine direction-oriented polymeric film 68 having oxygen barrier properties in accordance with the present disclosure is shown, for example, in FIG. 5. The machine direction-oriented polymeric film 68 has a nine-layer structure that includes a first skin layer 70, a second skin layer 72, a core layer 74, a first tie layer 76 interposed between the first skin layer 70 and the core layer 74, a second tie layer 78 interposed between the second skin layer 72 and the core layer 74, a first compatibilizing layer 80 interposed between the first skin layer 70 and the first tie layer 76, and a second compatibilizing layer 82 interposed between the second skin layer 72 and the second tie layer 78. Each of the first compatibilizing layer 80 and the second compatibilizing layer 82 independently includes a compatibilizing resin, which may be the same as one another or different, and which may be selected based on the specific oxygen barrier polymer contained in the core layer 74. Representative compatibilizing resins for use in accordance with the present disclosure include but are not limited to maleic anhydride-grafted polyethylene. In illustrative embodiments, the compatibilizing resin for use in accordance with the present disclosure includes the maleic anhydride-grafted polymeric material sold under the tradename RETAIN 3000 by The Dow Chemical Company (Midlands, Michigan). In illustrative embodiments, each of the first compatibilizing layer 80 and the second compatibilizing layer 82 includes a maleic anhydride-grafted polymeric material (e.g., RETAIN 3000) as a compatibilizing resin. In addition to a compatibilizing resin, each of the first compatibilizing layer 80 and the second compatibilizing layer 82 may further include a thermoplastic polymer (e.g., a polyethylene) which, in illustrative embodiments, includes metallocene linear low density polyethylene (mLLDPE), a high density polyethylene, or a combination thereof.

At a minimum, the above-described seven layers of the machine direction-oriented polymeric film 68 shown in FIG. 5—namely, the first skin layer 70, the first compatibilizing layer 80, the first tie layer 76, the core layer 74, the second tie layer 78, the second compatibilizing layer 82, and the second skin layer 72—may be used to form a recyclable version of a machine direction-oriented polymeric film 68 having oxygen barrier properties in accordance with the present disclosure. In some embodiments, however, one or more additional layers may be included. For example, as further shown in FIG. 5, the machine direction-oriented polymeric film 68 having oxygen barrier properties in accordance with the present disclosure may further include a first sub-skin layer 84 interposed between the first skin layer 70 and the first compatibilizing layer 80 and a second sub-skin layer 86 interposed between the second skin layer 72 and the second compatibilizing layer 82. In illustrative embodiments, each of the first sub-skin layer 84 and the second sub-skin layer 86 independently includes a thermoplastic polymer which, in some embodiments, is selected from the group consisting of metallocene linear low density polyethylene (mLLDPE), high density polyethylene, low density polyethylene, linear low density polyethylene, ultra-low density polyethylene, and a combination thereof. In some embodiments, each of the first sub-skin layer 84 and the second sub-skin layer 86 independently includes a thermoplastic polymer selected from the group consisting of metallocene linear low density polyethylene (mLLDPE), high density polyethylene, and a combination thereof. In illustrative embodiments, each of the first sub-skin layer 84 and the second sub-skin layer 86 includes high density polyethylene. Moreover, in illustrative embodiments, each of the first sub-skin layer 84 and the second sub-skin layer 86 further includes a compatibilizing resin, which may be the same as or different than the compatibilizing resins contained, respectively, in the first compatibilizing layer 80 and/or the second compatibilizing layer 82. In illustrative embodiments, each of the first sub-skin layer 84 and the second sub-skin layer 86 includes high density polyethylene and a maleic anhydride-grafted polymeric material (e.g., RETAIN 3000).

In some embodiments (not shown), the first skin layer 58 and/or the second skin layer 60 of the machine direction-oriented polymeric film 56 shown in FIG. 4, and the first skin layer 70 and/or the second skin layer 72 of the machine-direction-oriented polymeric film 68 shown in FIG. 5 optionally further includes a nucleating agent dispersed therein analogous to the structures shown in FIGS. 1 and 3 and described above.

In some embodiments of the nine-layered machine direction-oriented polymeric film 68 shown in FIG. 5, each of the first skin layer 70 and the second skin layer 72 independently includes from about 5% to about 45% by weight of the machine direction-oriented polymeric film, in other embodiments from about 10% to about 30%. In some embodiments of the nine-layered machine direction-oriented polymeric film 68 shown in FIG. 5, each of the first sub-skin layer 84 and the second sub-skin layer 86 independently includes from about 5% to about 40% by weight of the machine direction-oriented polymeric film, in other embodiments from about 5% to about 20%. In some embodiments of the nine-layered machine direction-oriented polymeric film 68 shown in FIG. 5, the core layer 74 includes from about 2% to about 80% by weight of the machine direction-oriented polymeric film, in other embodiments from about 2% to about 20%. In some embodiments of the nine-layered machine direction-oriented polymeric film 68 shown in FIG. 5, each of the first compatibilizing layer 80 and the second compatibilizing layer 82 independently includes from about 3% to about 40% by weight of the machine direction-oriented polymeric film, in other embodiments from about 3% to about 25%. In some embodiments of the nine-layered machine direction-oriented polymeric film 68 shown in FIG. 5, each of the first tie layer 76 and the second tie layer 78 independently includes from about 3% to about 25% by weight of the machine direction-oriented polymeric film, in other embodiments from about 3% to about 15%. In some embodiments of the nine-layered machine direction-oriented polymeric film 68 shown in FIG. 5, the first skin layer 70, the first sub-skin layer 84, the first compatibilizing layer 80, the first tie layer 76, the core layer 74, the second tie layer 78, the second compatibilizing layer 82, the second sub-skin layer 86, and the second skin layer 72 are provided, respectively, in an amount of 16.5/14.0/10.0/7.0/5.0/7.0/10.0/14.0/16.5 by weight of the machine direction-oriented polymeric film.

In accordance with the present disclosure, the thermoplastic polymer (or combination of thermoplastic polymers) used to make the first skin layer 4, the second skin layer 8, and the core layer 6 of the machine direction-oriented polymeric film 2 shown in FIG. 1, the first skin layer 26, the second skin layer 30, the core layer 28, the first sub-skin layer 32, and the second sub-skin layer 34 of the machine direction-oriented polymeric film 24 shown in FIG. 3, the first skin layer 58, the second skin layer 60, the first tie layer 64, and the second tie layer 66 of the machine direction-oriented polymeric film 56 shown in FIG. 4, and the thermoplastic polymer (or combination of thermoplastic polymers) used to make the first skin layer 70, the second skin layer 72, the first sub-skin layer 84, the second sub-skin layer 86, the first compatibilizing layer 80, the second compatibilizing layer 82, the first tie layer 76, and the second tie layer 78 of the machine direction-oriented polymeric film 68 shown in FIG. 5 is not restricted, and may include all manner of thermoplastic polymers. In illustrative embodiments, the thermoplastic polymer is a polyolefin, including but not limited to homopolymers, copolymers, terpolymers, and/or blends thereof.

Representative polyolefins that may be used in accordance with the present disclosure include but are not limited to low density polyethylene (LDPE), high density polyethylene (HDPE), medium density polyethylene (MDPE), linear medium density polyethylene (LMDPE), linear low density polyethylene (LLDPE), metallocene polyethylene (mPE), very low density polyethylene (VLDPE), ultra-low density polyethylene (ULDPE), polypropylene, ethylene-propylene copolymers, polymers made using a single-site catalyst, ethylene maleic anhydride copolymers (EMAs), ethylene vinyl acetate copolymers (EVAs), polymers made using Zeigler-Natta catalysts, styrene-containing block copolymers, and/or the like, and combinations thereof. Methods for manufacturing LDPE are described in *The Wiley Encyclopedia of Packaging Technology*, pp. 753-754 (Aaron L. Brody et al. eds., 2nd Ed. 1997) and in U.S. Pat. No. 5,399,426, both of which are incorporated by reference herein, except that in the event of any inconsistent disclosure or definition from the present specification, the disclosure or definition herein shall be deemed to prevail. ULDPE may be produced by a variety of processes, including but not limited to gas phase, solution and slurry polymerization as described in *The Wiley Encyclopedia of Packaging Technology*, pp. 748-50 (Aaron L. Brody et al. eds., 2nd Ed. 1997), incorporated by reference above, except that in the event of any inconsistent disclosure or definition from the present specification, the disclosure or definition herein shall be deemed to prevail. ULDPE may be manufactured using a Ziegler-Natta catalyst, although a number of other catalysts may also be used. For example, ULDPE may be manufactured with a metallocene catalyst. Alternatively, ULDPE may be manufactured with a catalyst that is a hybrid of a metallocene catalyst and a Ziegler-Natta catalyst. Methods for manufacturing ULDPE are also described in U.S. Pat. Nos. 5,399,426, 4,668,752, 3,058,963, 2,905,645, 2,862,917, and 2,699,457, each of which is incorporated by reference herein in its entirety, except that in the event of any inconsistent disclosure or definition from the present specification, the disclosure or definition herein shall be deemed to prevail. The density of ULDPE is achieved by copolymerizing ethylene with a sufficient amount of one or more monomers. In illustrative embodiments, the monomers are selected from 1-butene, 1-hexene, 4-methyl-1-pentene, 1-octene, and combinations thereof. Methods for manufacturing polypropylene are described in *Kirk-Othmer Concise Encyclopedia of Chemical Technology*, pp. 1420-1421 (Jacqueline I. Kroschwitz et al. eds., 4th Ed. 1999), which is incorporated herein by reference, except that in the event of any inconsistent disclosure or definition from the present specification, the disclosure or definition herein shall be deemed to prevail.

In illustrative embodiments, a polyolefin for use in accordance with the present disclosure includes polyethylene. In one example, the polyethylene includes a combination of low density polyethylene and high density polyethylene. In another example, the polyethylene includes a combination of low density polyethylene, high density polyethylene, and metallocene polyethylene. In another example, the polyolefin includes a combination of linear low density polyethylene, high density polyethylene, and low density polyethylene. In a further example, the polyolefin includes a combination of linear low density polyethylene and low density polyethylene. In a further example, the polyolefin includes a combination of linear low density polyethylene, high density polyethylene, and low density polyethylene.

In addition to containing one or more thermoplastic polymers and an optional nucleating agent, one or more of the first skin layer 4, the second skin layer 8, and the core layer 6 of the machine direction-oriented polymeric film 2 shown in FIG. 1, one or more of the first skin layer 26, the second skin layer 30, the core layer 28, the first sub-skin layer 32, and the second sub-skin layer 34 of the machine direction-oriented polymeric film 24 shown in FIG. 3, one or more of the first skin layer 58, the second skin layer 60, the first tie layer 64, and the second tie layer 66 shown in FIG. 4, and one or more of the first skin layer 70, the second skin layer 72, the first sub-skin layer 84, the second sub-skin layer 86, the first compatibilizing layer 80, the second compatibilizing layer 82, the first tie layer 76, the second tie layer 78, and the core layer 74 shown in FIG. 5 may optionally contain one or more additional components to improve the film properties or processing of the machine direction-oriented polymeric films or the unstretched substrate films that are precursors to the machine direction-oriented polymeric films. Representative optional components include but are not limited to anti-oxidants (e.g., added to reduce the tendency of the film to discolor over time) and processing aids (e.g., added to facilitate extrusion of the precursor film). In one example, the amount of one or more anti-oxidants in the precursor film is less than about 1% by weight of the film, and the amount of one or more processing aids is less than about 5% by weight of the film. Additional optional additives include but are not limited to antistatic agents, UV agents (e.g., UV blockers, UV stabilizers, UV absorbers, and/or the like), antiblocking agents (e.g., diatomaceous earth) and slip agents (e.g. erucamide), which may be added to allow film rolls to unwind properly and to facilitate secondary processing. In one example, the amount of one or more antiblocking agents and/or one or more slip agents is less than about 5% by weight of the film. Further additional optional additives include but are not limited to scents, deodorizers, pigments, noise reducing agents, and/or the like, and combinations thereof. In one example, the amount of one or more scents, deodorizers, pigments other than white, and/or noise reducing agents is less than about 10% by weight of the film.

In illustrative embodiments, a process for making a machine direction-oriented polymeric film in accordance with the present disclosure (e.g., films 2, 24, 56, and 68) includes (a) preheating a precursor film of a type described herein (e.g., an unstretched multi-layer film) at or below a melt temperature of a polymer contained in the precursor film to form a preheated precursor film, (b) stretching the preheated precursor film in a machine direction at a draw ratio of greater than or equal to about 5:1 at a temperature at or below the melt temperature of the polymer to form a machine direction-oriented stretched film, (c) annealing the machine direction-oriented stretched film to form the machine direction-oriented polymeric film, and (d) cooling the machine direction-oriented polymeric film after the annealing.

Figure 6:
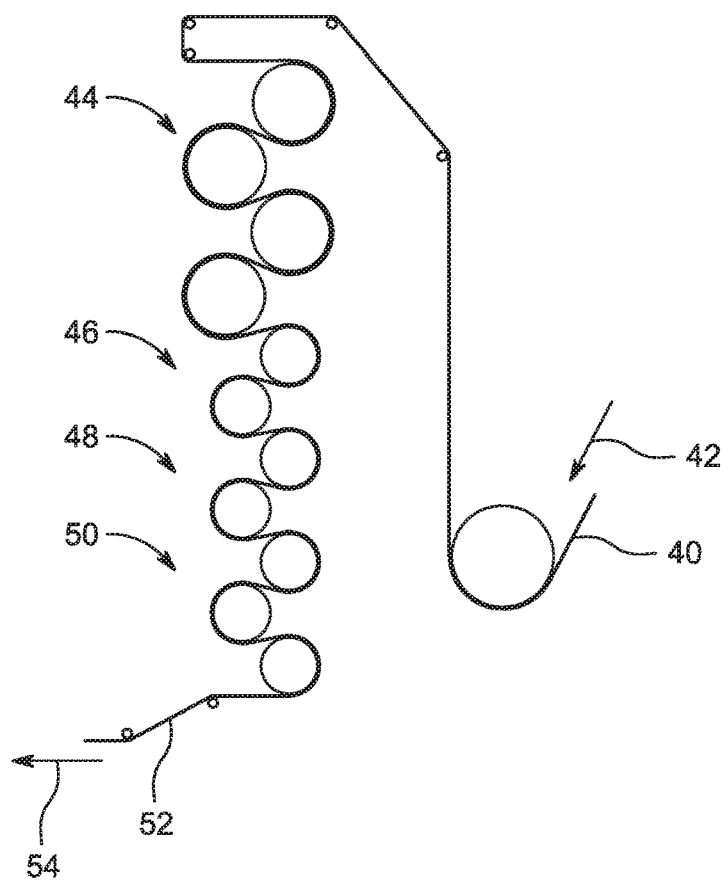
FIG. 6 is a diagrammatic view of an exemplary process for pre-heating, stretching, annealing, and cooling a precursor film.

An exemplary process for making a machine direction-oriented polymeric film in accordance with the present disclosure (e.g., films 2, 24, 56, and 68) is shown in FIG. 6 in simplified form. For example, a precursor film 40 prepared via an extrusion process (not shown) traveling in a direction 42 enters a preheat section 44 prior to being stretched. In some embodiments, the preheating may be achieved by running the film over 2-3 heated rolls. The purpose of the preheating step is to uniformly raise the temperature of the film 40 to orientation temperature. In illustrative embodiments, the roll and film temperature for HDPE-based films is between about 170° F. and about 260° F. (in other embodiments about 200° F. and about 260° F.). In illustrative embodiments, the preheating rolls are run at the higher end of this range to improve optical properties such as gloss and haze. As a general rule of thumb, the precursor film may be preheated to a temperature that is about 10 to about 20 degrees below the melt temperature of the polymer, thereby facilitating stretching at higher draw ratios and preventing sticking to the rolls.

The preheated precursor film exits preheat section 44 and enters draw section 46, as shown in FIG. 6. In the draw section 46, the preheated precursor film is stretched in a machine direction at a draw ratio of greater than or equal to about 3:1 at a temperature at or below the melt temperature of the polymer to form a machine direction-oriented stretched film. In illustrative embodiments, the draw ratio is greater than or equal to about 3.5:1, in some embodiments greater than or equal to 4:1, in some embodiments greater than or equal to about 5:1, in some embodiments greater than or equal to about 6:1, in some embodiments greater than or equal to about 7:1, in some embodiments greater than or equal to about 8:1, in some embodiments greater than or equal to about 9:1, in some embodiments greater than or equal to about 10:1, in some embodiments greater than or equal to about 11:1, and in some embodiments greater than or equal to about 12:1. In illustrative embodiments, the draw ratio ranges from about 5.5:1 to about 6.5:1.

The preheated precursor film is stretched across a pair of heated draw rolls in an S-wrap configuration to the desired draw ratio and final film thickness. In illustrative embodiments, the heated roll and film temperature are similar to that of the preheat rolls in the preheat section 44. For example, in illustrative embodiments, the roll and film temperature is about 10 to about 20 degrees below the melt temperature of a skin layer (e.g., an HDPE-containing skin layer, an MDPE-containing skin layer, or an LMDPE-containing skin layer). In some embodiments, the preheated precursor film is drawn up to 10:1 or even higher depending on the application. In some embodiments, the preheated precursor film is stretched in a draw ratio ranging from about 3:1 to about 10:1. In illustrative embodiments, the preheated precursor film is stretched in a draw ratio ranging from about 4:1 to about 8:1, and, in further illustrative embodiments, in a draw ratio of at least about 6:1. By way of example, for a draw ratio of 6:1, a preheated precursor film having an initial thickness of 5.75 mils would be stretched to provide a machine direction-oriented stretched film having a thickness of 0.96 mils. In the draw section 46, the gap between the two draw rolls should be as narrow as possible to prevent excessive neck-in from stretching the film. In illustrative embodiments, the draw roll temperatures in draw section may range from about 170° F. to about 260° F. for HDPE-based preheated precursor films.

The machine direction-oriented stretched film exits the draw section 46 and enters the anneal section 48 as shown in FIG. 6. In the anneal section 48, the machine direction-oriented stretched film is heat-treated in order to lock-in the final properties of the film. The first annealing roll after the draw section 46 is typically run at a reduced speed to allow for some relaxation, which helps to minimize curl and shrinkage when the film is later exposed to heat in downstream converting steps. The annealing rolls are typically set to the same temperature as the draw rolls. In illustrative embodiments, the roll temperatures in the anneal section 48 are in the range of about 125° F. to about 260° F. (in some embodiments, about 200° F. to about 260° F.). In some embodiments, multiple larger outer diameter rolls may be provided in the anneal section 48 in order to increase the film-to-roll contact time, which improves annealing efficacy.

The machine direction-oriented polymeric film exits the anneal section 48 and enters the cool section 50 as shown in FIG. 6. In the cool section 50, the machine direction-oriented polymeric film is cooled to ambient temperature for rewinding into rollstock. Since the film is shrinking during this stage, cooling is achieved in a step-down process over 3 to 4 rolls in order to minimize the chance for forming wrinkles or surface defects. In illustrative embodiments, the roll temperature in the cool section 50 ranges from about 250° F. down to about 140° F. and, in other embodiments, from about 250° F. down to about 70° F.

In illustrative embodiments, a process for making a machine direction-oriented polymeric film 2 in accordance with the present disclosure further includes (e) co-extruding at least a first composition, a second composition, and a third composition to form the precursor film, the first composition forming the first skin layer, the second composition forming the core layer, and the third composition forming the second skin layer, wherein the first composition and the third composition are identical or different. In some embodiments, the co-extruding is achieved via a blown film process, and in other embodiments via a cast film process. In some embodiments, the co-extruding, the preheating, the stretching, and the annealing are achieved sequentially in an in-line process. In other embodiments, the co-extruding is performed in one process, and the preheating, the stretching, and the annealing are performed in a separate process. In illustrative embodiments, a process for making a machine direction-oriented polymeric film 2 in accordance with the present disclosure further includes (f) treating the machine direction-oriented polymeric film (e.g., to enhance a print surface and/or lamination surface thereof). Representative types of treatments include but are not limited to corona, flame, and plasma treatments.

In illustrative embodiments, as noted above, a machine direction-oriented polymeric film prepared in accordance with the present disclosure (e.g., films 2, 24, 56, and 68) may have reduced strain at break in a machine direction (i.e., elongation), increased 1% secant modulus in a machine direction (i.e., stiffness), reduced haze, increased gloss, increased stress at break in the machine direction, reduced thickness, or a combination of one or more of these physical properties, as compared to conventional polymeric films.

In illustrative embodiments, a machine direction-oriented polymeric film in accordance with the present disclosure exhibits a reduced strain at break in the machine direction (i.e., elongation) than conventional polymeric films of similar thickness. In one example, a machine direction-oriented polymeric film in accordance with the present disclosure has a strain at break in the machine direction of less than about 300%. In another example, a machine direction-oriented polymeric film in accordance with the present disclosure has a strain at break in the machine direction of less than about 200%. In another example, a machine direction-oriented polymeric film in accordance with the present disclosure has a strain at break in the machine direction of less than about 100%. In another example, a machine direction-oriented polymeric film in accordance with the present disclosure has a strain at break in the machine direction of less than about 50%. In a further example, a machine direction-oriented polymeric film in accordance with the present disclosure has a strain at break in the machine direction of less than about 30%. In a further example, a machine direction-oriented polymeric film in accordance with the present disclosure has a strain at break in the machine direction of less than about 25%. In a further example, a machine direction-oriented polymeric film in accordance with the present disclosure has a strain at break in the machine direction of less than about 20%.

The strain at break in machine direction of a machine direction-oriented polymeric film in accordance with the present disclosure may be one of several different values or fall within one of several different ranges. For example, for a machine direction-oriented polymeric film having a thickness of less than about 2.0 mil—in some embodiments, less than about 1.9 mil, 1.8 mil, 1.7 mil, 1.6 mil, 1.5 mil, 1.4 mil, 1.3 mil, 1.2 mil, 1.1 mil, 1.0 mil, 0.9 mil, 0.8 mil, 0.7 mil, 0.6 mil, 0.5 mil, or 0.4 mil—it is within the scope of the present disclosure to select a strain at break in the machine direction to be less than or equal to one of the following values: about 300%, 299%, 298%, 297%, 296%, 295%, 294%, 293%, 292%, 291%, 290%, 289%, 288%, 287%, 286%, 285%, 284%, 283%, 282%, 281%, 280%, 279%, 278%, 277%, 276%, 275%, 274%, 273%, 272%, 271%, 270%, 269%, 268%, 267%, 266%, 265%, 264%, 263%, 262%, 261%, 260%, 259%, 258%, 257%, 256%, 255%, 254%, 253%, 252%, 251%, 250%, 249%, 248%, 247%, 246%, 245%, 244%, 243%, 242%, 241%, 240%, 239%, 238%, 237%, 236%, 235%, 234%, 233%, 232%, 231%, 230%, 229%, 228%, 227%, 226%, 225%, 224%, 223%, 222%, 221%, 220%, 219%, 218%, 217%, 216%, 215%, 214%, 213%, 212%, 211%, 210%, 209%, 208%, 207%, 206%, 205%, 204%, 203%, 202%, 201%, 200%, 199%, 198%, 197%, 196%, 195%, 194%, 193%, 192%, 191%, 190%, 189%, 188%, 187%, 186%, 185%, 184%, 183%, 182%, 181%, 180%, 179%, 178%, 177%, 176%, 175%, 174%, 173%, 172%, 171%, 170%, 169%, 168%, 167%, 166%, 165%, 164%, 163%, 162%, 161%, 160%, 159%, 158%, 157%, 156%, 155%, 154%, 153%, 152%, 151%, 150%, 149%, 148%, 147%, 146%, 145%, 144%, 143%, 142%, 141%, 140%, 139%, 138%, 137%, 136%, 135%, 134%, 133%, 132%, 131%, 130%, 129%, 128%, 127%, 126%, 125%, 124%, 123%, 122%, 121%, 120%, 119%, 118%, 117%, 116%, 115%, 114%, 113%, 112%, 111%, 110%, 109%, 108%, 107%, 106%, 105%, 104%, 103%, 102%, 101%, 100%, 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, 70%, 69%, 68%, 67%, 66%, 65%, 64%, 63%, 62%, 61%, 60%, 59%, 58%, 57%, 56%, 55%, 54%, 53%, 52%, 51%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, or 15%.

It is also within the scope of the present disclosure for the strain at break in the machine direction of the machine direction-oriented polymeric film to fall within one of many different ranges. In a first set of ranges, the strain at break in the machine direction for a machine direction-oriented polymeric film having a thickness of less than about 2.0 mil—in some embodiments, less than about 1.9 mil, 1.8 mil, 1.7 mil, 1.6 mil, 1.5 mil, 1.4 mil, 1.3 mil, 1.2 mil, 1.1 mil, 1.0 mil, 0.9 mil, 0.8 mil, 0.7 mil, 0.6 mil, 0.5 mil, or 0.4 mil—is in one of the following ranges: about 10% to 300%, 11% to 299%, 12% to 298%, 13% to 297%, 14% to 296%, 15% to 295%, 16% to 294%, 17% to 293%, 18% to 292%, 19% to 291%, 20% to 290%, 21% to 289%, 22% to 288%, 23% to 287%, 24% to 286%, 25% to 285%, 26% to 284%, 27% to 283%, 28% to 282%, 29% to 281%, 30% to 280%, 31% to 279%, 32% to 278%, 33% to 277%, 34% to 276%, 35% to 275%, 36% to 274%, 37% to 273%, 38% to 272%, 39% to 271%, 40% to 270%, 41% to 269%, 42% to 268%, 43% to 267%, 44% to 266%, 45% to 265%, 46% to 264%, 47% to 263%, 48% to 262%, 49% to 261%, 50% to 260%, 51% to 259%, 52% to 258%, 53% to 257%, 54% to 256%, 55% to 255%, 56% to 254%, 57% to 253%, 58% to 252%, 59% to 251%, 60% to 250%, 61% to 249%, 62% to 248%, 63% to 247%, 64% to 246%, 65% to 245%, 66% to 244%, 67% to 243%, 68% to 242%, 69% to 241%, 70% to 240%, 71% to 239%, 72% to 238%, 73% to 237%, 74% to 236%, 75% to 235%, 76% to 234%, 77% to 233%, 78% to 232%, 79% to 231%, 80% to 230%, 81% to 229%, 82% to 228%, 83% to 227%, 84% to 226%, 85% to 225%, 86% to 224%, 87% to 223%, 88% to 222%, 89% to 221%, 90% to 220%, 91% to 219%, 92% to 218%, 93% to 217%, 94% to 216%, 95% to 215%, 96% to 214%, 97% to 213%, 98% to 212%, 99% to 211%, 100% to 210%, 101% to 209%, 102% to 208%, 103% to 207%, 104% to 206%, 105% to 205%, 106% to 204%, 107% to 203%, 108% to 202%, 109% to 201%, 110% to 200%, 111% to 199%, 112% to 198%, 113% to 197%, 114% to 196%, 115% to 195%, 116% to 194%, 117% to 193%, 118% to 192%, 119% to 191%, 120% to 190%, 121% to 189%, 122% to 188%, 123% to 187%, 124% to 186%, 125% to 185%, 126% to 184%, 127% to 183%, 128% to 182%, 129% to 181%, 130% to 180%, 131% to 179%, 132% to 178%, 133% to 177%, 134% to 176%, 135% to 175%, 136% to 174%, 137% to 173%, 138% to 172%, 139% to 171%, 140% to 170%, 141% to 169%, 142% to 168%, 143% to 167%, 144% to 166%, 145% to 165%, 146% to 164%, 147% to 163%, 148% to 162%, 149% to 161%, 150% to 160%, 151% to 159%, 152% to 158%, 153% to 157%, or 154% to 156%. In a second set of ranges, the strain at break in the machine direction for a machine direction-oriented polymeric film having a thickness of less than about 2.0 mil—in some embodiments, less than about 1.9 mil, 1.8 mil, 1.7 mil, 1.6 mil, 1.5 mil, 1.4 mil, 1.3 mil, 1.2 mil, 1.1 mil, 1.0 mil, 0.9 mil, 0.8 mil, 0.7 mil, 0.6 mil, 0.5 mil, or 0.4 mil—is in one of the following ranges: about 11% to 300%, 12% to 300%, 13% to 300%, 14% to 300%, 15% to 300%, 16% to 300%, 17% to 300%, 18% to 300%, 19% to 300%, 20% to 300%, 21% to 300%, 22% to 300%, 23% to 300%, 24% to 300%, 25% to 300%, 26% to 300%, 27% to 300%, 28% to 300%, 29% to 300%, 30% to 300%, 31% to 300%, 32% to 300%, 33% to 300%, 34% to 300%, 35% to 300%, 36% to 300%, 37% to 300%, 38% to 300%, 39% to 300%, 40% to 300%, 41% to 300%, 42% to 300%, 43% to 300%, 44% to 300%, 45% to 300%, 46% to 300%, 47% to 300%, 48% to 300%, 49% to 300%, 50% to 300%, 51% to 300%, 52% to 300%, 53% to 300%, 54% to 300%, 55% to 300%, 56% to 300%, 57% to 300%, 58% to 300%, 59% to 300%, 60% to 300%, 61% to 300%, 62% to 300%, 63% to 300%, 64% to 300%, 65% to 300%, 66% to 300%, 67% to 300%, 68% to 300%, 69% to 300%, 70% to 300%, 71% to 300%, 72% to 300%, 73% to 300%, 74% to 300%, 75% to 300%, 76% to 300%, 77% to 300%, 78% to 300%, 79% to 300%, 80% to 300%, 81% to 300%, 82% to 300%, 83% to 300%, 84% to 300%, 85% to 300%, 86% to 300%, 87% to 300%, 88% to 300%, 89% to 300%, 90% to 300%, 91% to 300%, 92% to 300%, 93% to 300%, 94% to 300%, 95% to 300%, 96% to 300%, 97% to 300%, 98% to 300%, 99% to 300%, 100% to 300%, 101% to 300%, 102% to 300%, 103% to 300%, 104% to 300%, 105% to 300%, 106% to 300%, 107% to 300%, 108% to 300%, 109% to 300%, 110% to 300%, 111% to 300%, 112% to 300%, 113% to 300%, 114% to 300%, 115% to 300%, 116% to 300%, 117% to 300%, 118% to 300%, 119% to 300%, 120% to 300%, 121% to 300%, 122% to 300%, 123% to 300%, 124% to 300%, 125% to 300%, 126% to 300%, 127% to 300%, 128% to 300%, 129% to 300%, 130% to 300%, 131% to 300%, 132% to 300%, 133% to 300%, 134% to 300%, 135% to 300%, 136% to 300%, 137% to 300%, 138% to 300%, 139% to 300%, 140% to 300%, 141% to 300%, 142% to 300%, 143% to 300%, 144% to 300%, 145% to 300%, 146% to 300%, 147% to 300%, 148% to 300%, 149% to 300%, 150% to 300%, 151% to 300%, 152% to 300%, 153% to 300%, 154% to 300%, 155% to 300%, 156% to 300%, 157% to 300%, 158% to 300%, 159% to 300%, 160% to 300%, 161% to 300%, 162% to 300%, 163% to 300%, 164% to 300%, 165% to 300%, 166% to 300%, 167% to 300%, 168% to 300%, 169% to 300%, 170% to 300%, 171% to 300%, 172% to 300%, 173% to 300%, 174% to 300%, 175% to 300%, 176% to 300%, 177% to 300%, 178% to 300%, 179% to 300%, 180% to 300%, 181% to 300%, 182% to 300%, 183% to 300%, 184% to 300%, 185% to 300%, 186% to 300%, 187% to 300%, 188% to 300%, 189% to 300%, 190% to 300%, 191% to 300%, 192% to 300%, 193% to 300%, 194% to 300%, 195% to 300%, 196% to 300%, 197% to 300%, 198% to 300%, 199% to 300%, 200% to 300%, 201% to 300%, 202% to 300%, 203% to 300%, 204% to 300%, 205% to 300%, 206% to 300%, 207% to 300%, 208% to 300%, 209% to 300%, 210% to 300%, 211% to 300%, 212% to 300%, 213% to 300%, 214% to 300%, 215% to 300%, 216% to 300%, 217% to 300%, 218% to 300%, 219% to 300%, 220% to 300%, 221% to 300%, 222% to 300%, 223% to 300%, 224% to 300%, 225% to 300%, 226% to 300%, 227% to 300%, 228% to 300%, 229% to 300%, 230% to 300%, 231% to 300%, 232% to 300%, 233% to 300%, 234% to 300%, 235% to 300%, 236% to 300%, 237% to 300%, 238% to 300%, 239% to 300%, 240% to 300%, 241% to 300%, 242% to 300%, 243% to 300%, 244% to 300%, 245% to 300%, 246% to 300%, 247% to 300%, 248% to 300%, 249% to 300%, 250% to 300%, 251% to 300%, 252% to 300%, 253% to 300%, 254% to 300%, 255% to 300%, 256% to 300%, 257% to 300%, 258% to 300%, 259% to 300%, 260% to 300%, 261% to 300%, 262% to 300%, 263% to 300%, 264% to 300%, 265% to 300%, 266% to 300%, 267% to 300%, 268% to 300%, 269% to 300%, 270% to 300%, 271% to 300%, 272% to 300%, 273% to 300%, 274% to 300%, 275% to 300%, 276% to 300%, 277% to 300%, 278% to 300%, 279% to 300%, 280% to 300%, 281% to 300%, 282% to 300%, 283% to 300%, 284% to 300%, 285% to 300%, 286% to 300%, 287% to 300%, 288% to 300%, 289% to 300%, 290% to 300%, 291% to 300%, 292% to 300%, 293% to 300%, 294% to 300%, 295% to 300%, 296% to 300%, 297% to 300%, 298% to 300%, or 299% to 300%. In a third set of ranges, the strain at break in the machine direction for a machine direction-oriented polymeric film having a thickness of less than about 2.0 mil—in some embodiments, less than about 1.9 mil, 1.8 mil, 1.7 mil, 1.6 mil, 1.5 mil, 1.4 mil, 1.3 mil, 1.2 mil, 1.1 mil, 1.0 mil, 0.9 mil, 0.8 mil, 0.7 mil, 0.6 mil, 0.5 mil, or 0.4 mil—is in one of the following ranges: about 10% to 299%, 10% to 298%, 10% to 297%, 10% to 296%, 10% to 295%, 10% to 294%, 10% to 293%, 10% to 292%, 10% to 291%, 10% to 290%, 10% to 289%, 10% to 288%, 10% to 287%, 10% to 286%, 10% to 285%, 10% to 284%, 10% to 283%, 10% to 282%, 10% to 281%, 10% to 280%, 10% to 279%, 10% to 278%, 10% to 277%, 10% to 276%, 10% to 275%, 10% to 274%, 10% to 273%, 10% to 272%, 10% to 271%, 10% to 270%, 10% to 269%, 10% to 268%, 10% to 267%, 10% to 266%, 10% to 265%, 10% to 264%, 10% to 263%, 10% to 262%, 10% to 261%, 10% to 260%, 10% to 259%, 10% to 258%, 10% to 257%, 10% to 256%, 10% to 255%, 10% to 254%, 10% to 253%, 10% to 252%, 10% to 251%, 10% to 250%, 10% to 249%, 10% to 248%, 10% to 247%, 10% to 246%, 10% to 245%, 10% to 244%, 10% to 243%, 10% to 242%, 10% to 241%, 10% to 240%, 10% to 239%, 10% to 238%, 10% to 237%, 10% to 236%, 10% to 235%, 10% to 234%, 10% to 233%, 10% to 232%, 10% to 231%, 10% to 230%, 10% to 229%, 10% to 228%, 10% to 227%, 10% to 226%, 10% to 225%, 10% to 224%, 10% to 223%, 10% to 222%, 10% to 221%, 10% to 220%, 10% to 219%, 10% to 218%, 10% to 217%, 10% to 216%, 10% to 215%, 10% to 214%, 10% to 213%, 10% to 212%, 10% to 211% 10% to 210%, 10% to 209%, 10% to 208%, 10% to 207%, 10% to 206%, 10% to 205%, 10% to 204%, 10% to 203%, 10% to 202%, 10% to 201%, 10% to 200%, 10% to 199%, 10% to 198%, 10% to 197%, 10% to 196%, 10% to 195%, 10% to 194%, 10% to 193%, 10% to 192%, 10% to 191%, 10% to 190%, 10% to 189%, 10% to 188%, 10% to 187%, 10% to 186%, 10% to 185%, 10% to 184%, 10% to 183%, 10% to 182%, 10% to 181%, 10% to 180%, 10% to 179%, 10% to 178%, 10% to 177%, 10% to 176%, 10% to 175%, 10% to 174%, 10% to 173%, 10% to 172%, 10% to 171%, 10% to 170%, 10% to 169%, 10% to 168%, 10% to 167%, 10% to 166%, 10% to 165%, 10% to 164%, 10% to 163%, 10% to 162%, 10% to 161%, 10% to 160%, 10% to 159%, 10% to 158%, 10% to 157%, 10% to 156%, 10% to 155%, 10% to 154%, 10% to 153%, 10% to 152%, 10% to 151%, 10% to 150%, 10% to 149%, 10% to 148%, 10% to 147%, 10% to 146%, 10% to 145%, 10% to 144%, 10% to 143%, 10% to 142%, 10% to 141%, 10% to 140%, 10% to 139%, 10% to 138%, 10% to 137%, 10% to 136%, 10% to 135%, 10% to 134%, 10% to 133%, 10% to 132%, 10% to 131%, 10% to 130%, 10% to 129%, 10% to 128%, 10% to 127%, 10% to 126%, 10% to 125%, 10% to 124%, 10% to 123%, 10% to 122%, 10% to 121%, 10% to 120%, 10% to 119%, 10% to 118%, 10% to 117%, 10% to 116%, 10% to 115%, 10% to 114, 10% to 113%, 10% to 112%, 10% to 111%, 10% to 110%, 10% to 109%, 10% to 108%, 10% to 107%, 10% to 106%, 10% to 105%, 10% to 104%, 10% to 103%, 10% to 102%, 10% to 101%, 10% to 100%, 10% to 99%, 10% to 98%, 10% to 97%, 10% to 96%, 10% to 95%, 10% to 94%, 10% to 93%, 10% to 92%, 10% to 91%, 10% to 90%, 10% to 89%, 10% to 88%, 10% to 87%, 10% to 86%, 10% to 85%, 10% to 84%, 10% to 83%, 10% to 82%, 10% to 81%, 10% to 80%, 10% to 79%, 10% to 78%, 10% to 77%, 10% to 76%, 10% to 75%, 10% to 74%, 10% to 73%, 10% to 72%, 10% to 71%, 10% to 70%, 10% to 69%, 10% to 68%, 10% to 67%, 10% to 66%, 10% to 65%, 10% to 64%, 10% to 63%, 10% to 62%, 10% to 61%, 10% to 60%, 10% to 59%, 10% to 58%, 10% to 57%, 10% to 56%, 10% to 55%, 10% to 54%, 10% to 53%, 10% to 52%, 10% to 51%, 10% to 50%, 10% to 49%, 10% to 48%, 10% to 47%, 10% to 46%, 10% to 45%, 10% to 44%, 10% to 43%, 10% to 42%, 10% to 41%, 10% to 40%, 10% to 39%, 10% to 38%, 10% to 37%, 10% to 36%, 10% to 35%, 10% to 34%, 10% to 33%, 10% to 32%, 10% to 31%, 10% to 30%, 10% to 29%, 10% to 28%, 10% to 27%, 10% to 26%, 10% to 25%, 10% to 24%, 10% to 23%, 10% to 22%, 10% to 21%, 10% to 20%, 10% to 19%, 10% to 18%, 10% to 17%, 10% to 16%, 10% to 15%, 10% to 14, 10% to 13%, or 10% to 12%. In illustrative embodiments, the strain at break in the machine direction for a machine direction-oriented polymeric film having a thickness of less than about 2.0 mil—in some embodiments, less than about 1.9 mil, 1.8 mil, 1.7 mil, 1.6 mil, 1.5 mil, 1.4 mil, 1.3 mil, 1.2 mil, 1.1 mil, 1.0 mil, 0.9 mil, 0.8 mil, 0.7 mil, 0.6 mil, 0.5 mil, or 0.4 mil—is between about 20% and about 60%.

The 1% secant modulus in the machine direction of a machine direction-oriented polymeric film in accordance with the present disclosure may be one of several different values or fall within one of several different ranges. For example, for a machine direction-oriented polymeric film having a thickness of less than about 2.0 mil—in some embodiments, less than about 1.9 mil, 1.8 mil, 1.7 mil, 1.6 mil, 1.5 mil, 1.4 mil, 1.3 mil, 1.2 mil, 1.1 mil, 1.0 mil, 0.9 mil, 0.8 mil, 0.7 mil, 0.6 mil, 0.5 mil, or 0.4 mil—it is within the scope of the present disclosure to select a 1% secant modulus in the machine direction to be greater than or equal to one of the following values: about 150,000 psi; 151,000 psi; 152,000 psi; 153,000 psi; 154,000 psi; 155,000 psi; 156,000 psi; 157,000 psi; 158,000 psi; 159,000 psi; 160,000 psi; 161,000 psi; 162,000 psi; 163,000 psi; 164,000 psi; 165,000 psi; 166,000 psi; 167,000 psi; 168,000 psi; 169,000 psi; 170,000 psi; 171,000 psi; 172,000 psi; 173,000 psi; 174,000 psi; 175,000 psi; 176,000 psi; 177,000 psi; 178,000 psi; 179,000 psi; 180,000 psi; 181,000 psi; 182,000 psi; 183,000 psi; 184,000 psi; 185,000 psi; 186,000 psi; 187,000 psi; 188,000 psi; 189,000 psi; 190,000 psi; 191,000 psi; 192,000 psi; 193,000 psi; 194,000 psi; 195,000 psi; 196,000 psi; 197,000 psi; 198,000 psi; 199,000 psi; 200,000 psi; 201,000 psi; 202,000 psi; 203,000 psi; 204,000 psi; 205,000 psi; 206,000 psi; 207,000 psi; 208,000 psi; 209,000 psi; 210,000 psi; 211,000 psi; 212,000 psi; 213,000 psi; 214,000 psi; 215,000 psi; 216,000 psi; 217,000 psi; 218,000 psi; 219,000 psi; 220,000 psi; 221,000 psi; 222,000 psi; 223,000 psi; 224,000 psi; 225,000 psi; 226,000 psi; 227,000 psi; 228,000 psi; 229,000 psi; 230,000 psi; 231,000 psi; 232,000 psi; 233,000 psi; 234,000 psi; 235,000 psi; 236,000 psi; 237,000 psi; 238,000 psi; 239,000 psi; 240,000 psi; 241,000 psi; 242,000 psi; 243,000 psi; 244,000 psi; 245,000 psi; 246,000 psi; 247,000 psi; 248,000 psi; 249,000 psi; 250,000 psi; 251,000 psi; 252,000 psi; 253,000 psi; 254,000 psi; 255,000 psi; 256,000 psi; 257,000 psi; 258,000 psi; 259,000 psi; 260,000 psi; 261,000 psi; 262,000 psi; 263,000 psi; 264,000 psi; 265,000 psi; 266,000 psi; 267,000 psi; 268,000 psi; 269,000 psi; 270,000 psi; 271,000 psi; 272,000 psi;

273,000 psi; 274,000 psi; 275,000 psi; 276,000 psi; 277,000 psi; 278,000 psi; 279,000 psi; 280,000 psi; 281,000 psi; 282,000 psi; 283,000 psi; 284,000 psi; 285,000 psi; 286,000 psi; 287,000 psi; 288,000 psi; 289,000 psi; 290,000 psi; 291,000 psi; 292,000 psi; 293,000 psi; 294,000 psi; 295,000 psi; 296,000 psi; 297,000 psi; 298,000 psi; 299,000 psi; 300,000 psi; 301,000 psi; 302,000 psi; 303,000 psi; 304,000 psi; 305,000 psi; 306,000 psi; 307,000 psi; 308,000 psi; 309,000 psi; 310,000 psi; 311,000 psi; 312,000 psi; 313,000 psi; 314,000 psi; 315,000 psi; 316,000 psi; 317,000 psi; 318,000 psi; 319,000 psi; 320,000 psi; 321,000 psi; 322,000 psi; 323,000 psi; 324,000 psi; 325,000 psi; 326,000 psi; 327,000 psi; 328,000 psi; 329,000 psi; 330,000 psi; 331,000 psi; 332,000 psi; 333,000 psi; 334,000 psi; 335,000 psi; 336,000 psi; 337,000 psi; 338,000 psi; 339,000 psi; 340,000 psi; 341,000 psi; 342,000 psi; 343,000 psi; 344,000 psi; 345,000 psi; 346,000 psi; 347,000 psi; 348,000 psi; 349,000 psi; 350,000 psi; 351,000 psi; 352,000 psi; 353,000 psi; 354,000 psi; 355,000 psi; 356,000 psi; 357,000 psi; 358,000 psi; 359,000 psi; 360,000 psi; 361,000 psi; 362,000 psi; 363,000 psi; 364,000 psi; 365,000 psi; 366,000 psi; 367,000 psi; 368,000 psi; 369,000 psi; 370,000 psi; 371,000 psi; 372,000 psi; 373,000 psi; 374,000 psi; 375,000 psi; 376,000 psi; 377,000 psi; 378,000 psi; 379,000 psi; 380,000 psi; 381,000 psi; 382,000 psi; 383,000 psi; 384,000 psi; 385,000 psi; 386,000 psi; 387,000 psi; 388,000 psi; 389,000 psi; 390,000 psi; 391,000 psi; 392,000 psi; 393,000 psi; 394,000 psi; 395,000 psi; 396,000 psi; 397,000 psi; 398,000 psi; 399,000 psi; 400,000 psi; 401,000 psi; 402,000 psi; 403,000 psi; 404,000 psi; 405,000 psi; 406,000 psi; 407,000 psi; 408,000 psi; 409,000 psi; 410,000 psi; 411,000 psi; 412,000 psi; 413,000 psi; 414,000 psi; 415,000 psi; 416,000 psi; 417,000 psi; 418,000 psi; 419,000 psi; 420,000 psi; 421,000 psi; 422,000 psi; 423,000 psi; 424,000 psi; 425,000 psi; 426,000 psi; 427,000 psi; 428,000 psi; 429,000 psi; 430,000 psi; 431,000 psi; 432,000 psi; 433,000 psi; 434,000 psi; 435,000 psi; 436,000 psi; 437,000 psi; 438,000 psi; 439,000 psi; 440,000 psi; 441,000 psi; 442,000 psi; 443,000 psi; 444,000 psi; 445,000 psi; 446,000 psi; 447,000 psi; 448,000 psi; 449,000 psi; 450,000 psi; 451,000 psi; 452,000 psi; 453,000 psi; 454,000 psi; 455,000 psi; 456,000 psi; 457,000 psi; 458,000 psi; 459,000 psi; 460,000 psi; 461,000 psi; 462,000 psi; 463,000 psi; 464,000 psi; 465,000 psi; 466,000 psi; 467,000 psi; 468,000 psi; 469,000 psi; 470,000 psi; 471,000 psi; 472,000 psi; 473,000 psi; 474,000 psi; 475,000 psi; 476,000 psi; 477,000 psi; 478,000 psi; 479,000 psi; 480,000 psi; 481,000 psi; 482,000 psi; 483,000 psi; 484,000 psi; 485,000 psi; 486,000 psi; 487,000 psi; 488,000 psi; 489,000 psi; 490,000 psi; 491,000 psi; 492,000 psi; 493,000 psi; 494,000 psi; 495,000 psi; 496,000 psi; 497,000 psi; 498,000 psi; 499,000 psi; or 500,000 psi.

It is also within the scope of the present disclosure for the 1% secant modulus in machine direction of the machine direction-oriented polymeric film to fall within one of many different ranges. In a first set of ranges, the 1% secant modulus in machine direction for a machine direction-oriented polymeric film having a thickness of less than about 2.0 mil—in some embodiments, less than about 1.9 mil, 1.8 mil, 1.7 mil, 1.6 mil, 1.5 mil, 1.4 mil, 1.3 mil, 1.2 mil, 1.1 mil, 1.0 mil, 0.9 mil, 0.8 mil, 0.7 mil, 0.6 mil, 0.5 mil, or 0.4 mil—is in one of the following ranges: about 150,000 psi to 500,000 psi; 155,000 psi to 495,000 psi; 160,000 psi to 490,000 psi; 165,000 psi to 485,000 psi; 170,000 psi to 480,000 psi; 175,000 psi to 475,000 psi; 180,000 psi to 470,000 psi; 185,000 psi to 465,000 psi; 190,000 psi to 460,000 psi; 195,000 psi to 455,000 psi; 200,000 psi to 450,000 psi; 205,000 psi to 445,000 psi; 210,000 psi to 440,000 psi; 215,000 psi to 435,000 psi; 220,000 psi to 430,000 psi; 225,000 psi to 425,000 psi; 230,000 psi to 420,000 psi; 235,000 psi to 415,000 psi; 240,000 psi to 410,000 psi; 245,000 psi to 405,000 psi; 250,000 psi to 400,000 psi; 255,000 psi to 395,000 psi; 260,000 psi to 390,000 psi; 265,000 psi to 385,000 psi; 270,000 psi to 380,000 psi; 275,000 psi to 375,000 psi; 280,000 psi to 370,000 psi; 285,000 psi to 365,000 psi; 290,000 psi to 365,000 psi; 295,000 psi to 365,000 psi; 300,000 psi to 365,000 psi; 305,000 psi to 365,000 psi; 310,000 psi to 365,000 psi; 315,000 psi to 365,000 psi; 320,000 psi to 365,000 psi; 325,000 psi to 365,000 psi; 330,000 psi to 365,000 psi; 335,000 psi to 365,000 psi; 340,000 psi to 365,000 psi; 345,000 psi to 365,000 psi; 350,000 psi to 365,000 psi; 355,000 psi to 365,000 psi; or 360,000 psi to 365,000 psi. In a second set of ranges, the 1% secant modulus in machine direction for a machine direction-oriented polymeric film having a thickness of less than about 2.0 mil—in some embodiments, less than about 1.9 mil, 1.8 mil, 1.7 mil, 1.6 mil, 1.5 mil, 1.4 mil, 1.3 mil, 1.2 mil, 1.1 mil, 1.0 mil, 0.9 mil, 0.8 mil, 0.7 mil, 0.6 mil, 0.5 mil, or 0.4 mil—is in one of the following ranges: about 150,000 psi to 500,000 psi; 155,000 psi to 500,000 psi; 160,000 psi to 500,000 psi; 165,000 psi to 500,000 psi; 170,000 psi to 500,000 psi; 175,000 psi to 500,000 psi; 180,000 psi to 500,000 psi; 185,000 psi to 500,000 psi; 190,000 psi to 500,000 psi; 195,000 psi to 500,000 psi; 200,000 psi to 500,000 psi; 205,000 psi to 500,000 psi; 210,000 psi to 500,000 psi; 215,000 psi to 500,000 psi; 220,000 psi to 500,000 psi; 225,000 psi to 500,000 psi; 226,000 psi to 500,000 psi; 230,000 psi to 500,000 psi; 235,000 psi to 500,000 psi; 240,000 psi to 500,000 psi; 245,000 psi to 500,000 psi; 250,000 psi to 500,000 psi; 255,000 psi to 500,000 psi; 260,000 psi to 500,000 psi; 265,000 psi to 500,000 psi; 270,000 psi to 500,000 psi; 275,000 psi to 500,000 psi; 280,000 psi to 500,000 psi; 285,000 psi to 500,000 psi; 290,000 psi to 500,000 psi; 295,000 psi to 500,000 psi; 300,000 psi to 500,000 psi; 305,000 psi to 500,000 psi; 310,000 psi to 500,000 psi; 315,000 psi to 500,000 psi; 320,000 psi to 500,000 psi; 325,000 psi to 500,000 psi; 330,000 psi to 500,000 psi; 335,000 psi to 500,000 psi; 340,000 psi to 500,000 psi; 345,000 psi to 500,000 psi; 350,000 psi to 500,000 psi; 355,000 psi to 500,000 psi; 360,000 psi to 500,000 psi; 365,000 psi to 500,000 psi; 370,000 psi to 500,000 psi; 375,000 psi to 500,000 psi; 380,000 psi to 500,000 psi; 385,000 psi to 500,000 psi; 390,000 psi to 500,000 psi; 400,000 psi to 500,000 psi; 405,000 psi to 500,000 psi; 410,000 psi to 500,000 psi; 415,000 psi to 500,000 psi; 420,000 psi to 500,000 psi; 425,000 psi to 500,000 psi; 430,000 psi to 500,000 psi; 435,000 psi to 500,000 psi; 440,000 psi to 500,000 psi; 445,000 psi to 500,000 psi; 450,000 psi to 500,000 psi; 455,000 psi to 500,000 psi; 460,000 psi to 500,000 psi; 465,000 psi to 500,000 psi; 470,000 psi to 500,000 psi; 475,000 psi to 500,000 psi; 480,000 psi to 500,000 psi; 485,000 psi to 500,000 psi; 490,000 psi to 500,000 psi; or 495,000 psi to 500,000 psi. In a third set of ranges, the 1% secant modulus in machine direction for a machine direction-oriented polymeric film having a thickness of less than about 2.0 mil—in some embodiments, less than about 1.9 mil, 1.8 mil, 1.7 mil, 1.6 mil, 1.5 mil, 1.4 mil, 1.3 mil, 1.2 mil, 1.1 mil, 1.0 mil, 0.9 mil, 0.8 mil, 0.7 mil, 0.6 mil, 0.5 mil, or 0.4 mil—is in one of the following ranges: about 150,000 psi to 499,000 psi; 150,000 psi to 495,000 psi; 150,000 psi to 490,000 psi; 150,000 psi to 485,000 psi; 150,000 psi to 480,000 psi; 150,000 psi to 475,000 psi; 150,000 psi to 470,000 psi; 150,000 psi to 465,000 psi; 150,000 psi to 460,000 psi; 150,000 psi to 455,000 psi; 150,000 psi to 450,000 psi; 150,000 psi to 445,000 psi; 150,000 psi to 440,000 psi; 150,000 psi to 435,000 psi; 150,000 psi to 430,000 psi; 150,000 psi to 425,000 psi; 150,000 psi to 420,000 psi; 150,000 psi to 415,000 psi; 150,000 psi to 410,000 psi; 150,000 psi to 405,000 psi; or 150,000 psi to 400,000 psi; 150,000 psi to 395,000 psi; 150,000 psi to 390,000 psi; 150,000 psi to 385,000 psi; 150,000 psi to 380,000 psi; 150,000 psi to 375,000 psi; 150,000 psi to 370,000 psi; 150,000 psi to 365,000 psi; 150,000 psi to 360,000 psi; 150,000 psi to 355,000 psi; 150,000 psi to 350,000 psi; 150,000 psi to 345,000 psi; 150,000 psi to 340,000 psi; 150,000 psi to 335,000 psi; 150,000 psi to 330,000 psi; 150,000 psi to 325,000 psi; 150,000 psi to 320,000 psi; 150,000 psi to 315,000 psi; 150,000 psi to 310,000 psi; 150,000 psi to 305,000 psi; 150,000 psi to 300,000 psi; 150,000 psi to 295,000 psi; 150,000 psi to 290,000 psi; 150,000 psi to 285,000 psi; 150,000 psi to 280,000 psi; 150,000 psi to 275,000 psi; 150,000 psi to 270,000 psi; 150,000 psi to 265,000 psi; 150,000 psi to 260,000 psi; 150,000 psi to 255,000 psi; 150,000 psi to 250,000 psi; 150,000 psi to 245,000 psi; 150,000 psi to 240,000 psi; 150,000 psi to 235,000 psi; 150,000 psi to 230,000 psi; 150,000 psi to 225,000 psi; 150,000 psi to 220,000 psi; 150,000 psi to 215,000 psi; 150,000 psi to 210,000 psi; 150,000 psi to 205,000 psi; 150,000 psi to 200,000 psi; 150,000 psi to 195,000 psi; 150,000 psi to 190,000 psi; 150,000 psi to 185,000 psi; 150,000 psi to 180,000 psi; 150,000 psi to 175,000 psi; 150,000 psi to 170,000 psi; 150,000 psi to 165,000 psi; 150,000 psi to 160,000 psi; or 150,000 psi to 155,000 psi. In some embodiments, it is desirable for a machine direction-oriented polymeric film in accordance with the present disclosure to have toughness. In such embodiments, the 1% secant modulus in machine direction for the machine direction-oriented polymeric film may be between about 150,000 psi and about 225,000 psi. In other embodiments, a machine direction-oriented polymeric film in accordance with the present disclosure is configured for straight line tear or stiffness. In such embodiments, the 1% secant modulus in machine direction for the machine direction-oriented polymeric film may be between about 225,000 psi and about 500,000 psi.

The 45 degree gloss of a machine direction-oriented polymeric film in accordance with the present disclosure may be one of several different values or fall within one of several different ranges. For example, it is within the scope of the present disclosure to select a 45 degree gloss to be greater than or equal to one of the following values: about 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99%. In some embodiments (e.g., a machine direction-oriented polymeric film having a non-nucleated high density skin layer), the 45 degree gloss of the film may be greater than about 20%. In other embodiments, embodiments (e.g., a machine direction-oriented polymeric film having a nucleated high density skin layer), the 45 degree gloss of the film may be greater than about 65%.

It is also within the scope of the present disclosure for the 45 degree gloss of the machine direction-oriented polymeric film to fall within one of many different ranges. In a first set of ranges, the 45 degree gloss for a machine direction-oriented polymeric film in accordance with the present disclosure is in one of the following ranges: about 20% to 99%, 21% to 98%, 22% to 97%, 23% to 96%, 24% to 95%, 25% to 94%, 26% to 93%, 27% to 92%, 28% to 91%, 29% to 90%, 30% to 89%, 31% to 88%, 32% to 87%, 33% to 86%, 34% to 85%, 35% to 84%, 36% to 83%, 37% to 82%, 38% to 81%, 39% to 80%, 40% to 79%, 41% to 78%, 42% to 77%, 43% to 76%, 44% to 75%, 45% to 74%, 46% to 73%, 47% to 72%, 48% to 71%, 49% to 70% 50% to 69%, 51% to 68%, 52% to 67%, 53% to 66%, 54% to 65%, 55% to 64%, 56% to 63%, 57% to 62%, 58% to 61%, or 59% to 60%. In a second set of ranges, the 45 degree gloss for a machine direction-oriented polymeric film in accordance with the present disclosure is in one of the following ranges: about 19% to 99%, 20% to 99%, 21% to 99%, 22% to 99%, 23% to 99%, 24% to 99%, 25% to 99%, 26% to 99%, 27% to 99%, 28% to 99%, 29% to 99%, 30% to 99%, 31% to 99%, 32% to 99%, 33% to 99%, 34% to 99%, 35% to 99%, 36% to 99%, 37% to 99%, 38% to 99%, 39% to 99%, 40% to 99%, 41% to 99%, 42% to 99%, 43% to 99%, 44% to 99%, 45% to 99%, 46% to 99%, 47% to 99%, 48% to 99%, 49% to 99%, 50% to 99%, 51% to 99%, 52% to 99%, 53% to 99%, 54% to 99%, 55% to 99%, 56% to 99%, 57% to 99%, 58% to 99%, 59% to 99%, 60% to 99%, 61% to 99%, 62% to 99%, 63% to 99%, 64% to 99%, 65% to 99%, 66% to 99%, 67% to 99%, 68% to 99%, 69% to 99%, 70% to 99%, 71% to 99%, 72% to 99%, 73% to 99%, 74% to 99%, 75% to 99%, 76% to 99%, 77% to 99%, 78% to 99%, 79% to 99%, 80% to 99%, 81% to 99%, 82% to 99%, 83% to 99%, 84% to 99%, 85% to 99%, 86% to 99%, 87% to 99%, 88% to 99%, 89% to 99%, or 90% to 99%. In a third set of ranges, the 45 degree gloss for a machine direction-oriented polymeric film in accordance with the present disclosure is in one of the following ranges: about 20% to 98%, 20% to 97%, 20% to 96%, 20% to 95%, 20% to 94%, 20% to 93%, 20% to 92%, 20% to 91%, 20% to 90%, 20% to 89%, 20% to 88%, 20% to 87%, 20% to 86%, 20% to 85%, 20% to 84%, 20% to 83%, 20% to 82%, 20% to 81%, 20% to 80%, 20% to 79%, 20% to 78%, 20% to 77%, 20% to 76%, 20% to 75%, 20% to 74%, 20% to 73%, 20% to 72%, 20% to 71%, 20% to 70%, 20% to 69%, 20% to 68%, 20% to 67%, 20% to 66%, 20% to 65%, 20% to 64%, 20% to 63%, 20% to 62%, 20% to 61%, 20% to 60%, 20% to 59%, 20% to 58%, 20% to 57%, 20% to 56%, 20% to 55%, 20% to 54%, 20% to 53%, 20% to 52%, 20% to 51%, 20% to 50%, 20% to 49%, 20% to 48%, 20% to 47%, 20% to 46%, 20% to 45%, 20% to 44%, 20% to 43%, 20% to 42%, 20% to 41%, 20% to 40%, 20% to 39%, 20% to 38%, 20% to 37%, 20% to 36%, 20% to 35%, 20% to 34%, 20% to 33%, 20% to 32%, 20% to 31%, 20% to 30%, 20% to 29%, 20% to 28%, 20% to 27%, 20% to 26%, 20% to 25%, 20% to 24%, 20% to 23%, 20% to 22%, or 20% to 21%. In illustrative embodiments, the 45 degree gloss for a machine direction-oriented polymeric film in accordance with the present disclosure is between about 60% and about 85%. In some embodiments, it is desirable for a machine direction-oriented polymeric film in accordance with the present disclosure to have a matte finish. In such embodiments, the 45 degree gloss for the matte finish machine direction-oriented polymeric film may be less than about 25%.

The haze of a machine direction-oriented polymeric film in accordance with the present disclosure may be one of several different values or fall within one of several different ranges. For example, it is within the scope of the present disclosure to select a haze to be less than or equal to one of the following values: about 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, or 1%.

It is also within the scope of the present disclosure for the haze of the machine direction-oriented polymeric film to fall within one of many different ranges. In a first set of ranges, the haze for a machine direction-oriented polymeric film in accordance with the present disclosure is in one of the following ranges: about 1% to 35%, 2% to 34%, 3% to 33%, 4% to 32%, 5% to 31%, 6% to 30%, 7% to 29%, 8% to 28%, 9% to 27%, 10% to 26%, 11% to 25%, 12% to 24%, 13% to 23%, 14% to 22%, 15% to 21%, 16% to 20%, or 17% to 19%. In a second set of ranges, the haze for a machine direction-oriented polymeric film in accordance with the present disclosure is in one of the following ranges: about 2% to 35%, 3% to 35%, 4% to 35%, 5% to 35%, 6% to 35%, 7% to 35%, 8% to 35%, 9% to 35%, 10% to 35%, 11% to 35%, 12% to 35%, 13% to 35%, 14% to 35%, 15% to 35%, 16% to 35%, 17% to 35%, 18% to 35%, 19% to 35%, 20% to 35%, 21% to 35%, 22% to 35%, 23% to 35%, 24% to 35%, 25% to 35%, 26% to 35%, 27% to 35%, 28% to 35%, 29% to 35%, 30% to 35%, 31% to 35%, 32% to 35%, 33% to 35%, or 34% to 35%. In a third set of ranges, the haze for a machine direction-oriented polymeric film in accordance with the present disclosure is in one of the following ranges: about 1% to 35%, 1% to 34%, 1% to 33%, 1% to 32%, 1% to 31%, 1% to 30%, 1% to 29%, 1% to 28%, 1% to 27%, 1% to 26%, 1% to 25%, 1% to 24%, 1% to 23%, 1% to 22%, 1% to 21%, 1% to 20%, 1% to 19%, 1% to 18%, 1% to 17%, 1% to 16%, 1% to 15%, 1% to 14%, 1% to 13%, 1% to 12%, 1% to 11%, 1% to 10%, 1% to 9%, 1% to 8%, 1% to 7%, 1% to 6%, 1% to 5%, 1% to 4%, 1% to 3%, or 1% to 2%. In illustrative embodiments, the haze for a machine direction-oriented polymeric film in accordance with the present disclosure is between about 3% and about 21% and, in some embodiments, between about 3% and about 6%. In some embodiments, it is desirable for a machine direction-oriented polymeric film in accordance with the present disclosure to have a matte finish. In such embodiments, the haze for the matte finish machine direction-oriented polymeric film may be greater than about 50%.

The stress at break in the machine direction of a machine direction-oriented polymeric film in accordance with the present disclosure may be one of several different values or fall within one of several different ranges. For example, for a machine direction-oriented polymeric film having a thickness of less than about 2.0 mil—in some embodiments, less than about 1.9 mil, 1.8 mil, 1.7 mil, 1.6 mil, 1.5 mil, 1.4 mil, 1.3 mil, 1.2 mil, 1.1 mil, 1.0 mil, 0.9 mil, 0.8 mil, 0.7 mil, 0.6 mil, 0.5 mil, or 0.4 mil—it is within the scope of the present disclosure to select a stress at break in the machine direction to be greater than or equal to one of the following values: about 10,000 psi; 11,000 psi; 12,000 psi; 13,000 psi; 14,000 psi; 15,000 psi; 16,000 psi; 17,000 psi; 18,000 psi; 19,000 psi; 20,000 psi; 21,000 psi; 22,000 psi; 23,000 psi; 24,000 psi; 25,000 psi; 26,000 psi; 27,000 psi; 28,000 psi; 29,000 psi; 30,000 psi; 31,000 psi; 32,000 psi; 33,000 psi; 34,000 psi; 35,000 psi; 36,000 psi; 37,000 psi; 38,000 psi; 39,000 psi; 40,000 psi; 41,000 psi; 42,000 psi; 43,000 psi; 44,000 psi; 45,000 psi; 46,000 psi; 47,000 psi; 48,000 psi; 49,000 psi; or 50,000 psi.

It is also within the scope of the present disclosure for the stress at break in the machine direction of the machine direction-oriented polymeric film to fall within one of many different ranges. In a first set of ranges, the stress at break in the machine direction for a machine direction-oriented polymeric film having a thickness of less than about 2.0 mil—in some embodiments, less than about 1.9 mil, 1.8 mil, 1.7 mil, 1.6 mil, 1.5 mil, 1.4 mil, 1.3 mil, 1.2 mil, 1.1 mil, 1.0 mil, 0.9 mil, 0.8 mil, 0.7 mil, 0.6 mil, 0.5 mil, or 0.4 mil—is in one of the following ranges: about 10,000 psi to about 60,000 psi; 11,000 psi to about 59,000 psi; 12,000 psi to about 58,000 psi; 13,000 psi to about 57,000 psi; 14,000 psi to about 56,000 psi; 15,000 psi to about 55,000 psi; 16,000 psi to about 54,000 psi; 17,000 psi to about 53,000 psi; 18,000 psi to about 52,000 psi; 19,000 psi to about 51,000 psi; 20,000 psi to about 50,000 psi; 21,000 psi to about 49,000 psi; 22,000 psi to about 48,000 psi; 23,000 psi to about 47,000 psi; 24,000 psi to about 46,000 psi; 25,000 psi to about 45,000 psi; 26,000 psi to about 44,000 psi; 27,000 psi to about 43,000 psi; 28,000 psi to about 44,000 psi; 29,000 psi to about 44,000 psi; 30,000 psi to about 44,000 psi; 31,000 psi to about 44,000 psi; 32,000 psi to about 44,000 psi; 33,000 psi to about 44,000 psi; 34,000 psi to about 44,000 psi; 35,000 psi to about 44,000 psi; 36,000 psi to about 44,000 psi; 37,000 psi to about 44,000 psi; 38,000 psi to about 44,000 psi; 39,000 psi to about 44,000 psi; 40,000 psi to about 44,000 psi; 41,000 psi to about 44,000 psi; 42,000 psi to about 44,000 psi; or 43,000 psi to about 44,000 psi. In a second set of ranges, the stress at break in the machine direction for a machine direction-oriented polymeric film having a thickness of less than about 2.0 mil—in some embodiments, less than about 1.9 mil, 1.8 mil, 1.7 mil, 1.6 mil, 1.5 mil, 1.4 mil, 1.3 mil, 1.2 mil, 1.1 mil, 1.0 mil, 0.9 mil, 0.8 mil, 0.7 mil, 0.6 mil, 0.5 mil, or 0.4 mil—is in one of the following ranges: about 10,000 psi to about 60,000 psi; 11,000 psi to about 60,000 psi; 12,000 psi to about 60,000 psi; 13,000 psi to about 60,000 psi; 14,000 psi to about 60,000 psi; 15,000 psi to about 60,000 psi; 16,000 psi to about 60,000 psi; 17,000 psi to about 60,000 psi; 18,000 psi to about 60,000 psi; 19,000 psi to about 60,000 psi; 20,000 psi to about 60,000 psi; 21,000 psi to about 60,000 psi; 22,000 psi to about 60,000 psi; 23,000 psi to about 60,000 psi; 24,000 psi to about 60,000 psi; 25,000 psi to about 60,000 psi; 26,000 psi to about 60,000 psi; 27,000 psi to about 60,000 psi; 28,000 psi to about 60,000 psi; 29,000 psi to about 60,000 psi; 30,000 psi to about 60,000 psi; 31,000 psi to about 60,000 psi; 32,000 psi to about 60,000 psi; 33,000 psi to about 60,000 psi; 34,000 psi to about 60,000 psi; 35,000 psi to about 60,000 psi; 36,000 psi to about 60,000 psi; 37,000 psi to about 60,000 psi; 38,000 psi to about 60,000 psi; 39,000 psi to about 60,000 psi; 40,000 psi to about 60,000 psi; 41,000 psi to about 60,000 psi; 42,000 psi to about 60,000 psi; 43,000 psi to about 60,000 psi; 44,000 psi to about 60,000 psi; 45,000 psi to about 60,000 psi; 46,000 psi to about 60,000 psi; 47,000 psi to about 60,000 psi; 48,000 psi to about 60,000 psi; 49,000 psi to about 60,000 psi; 50,000 psi to about 60,000 psi; 51,000 psi to about 60,000 psi; 52,000 psi to about 60,000 psi; 53,000 psi to about 60,000 psi; 54,000 psi to about 60,000 psi; 55,000 psi to about 60,000 psi; 56,000 psi to about 60,000 psi; 57,000 psi to about 60,000 psi; 58,000 psi to about 60,000 psi; or 59,000 psi to about 60,000 psi. In a third set of ranges, the stress at break in the machine direction for a machine direction-oriented polymeric film having a thickness of less than about 2.0 mil—in some embodiments, less than about 1.9 mil, 1.8 mil, 1.7 mil, 1.6 mil, 1.5 mil, 1.4 mil, 1.3 mil, 1.2 mil, 1.1 mil, 1.0 mil, 0.9 mil, 0.8 mil, 0.7 mil, 0.6 mil, 0.5 mil, or 0.4 mil—is in one of the following ranges: about 10,000 psi to about 59,000 psi; 10,000 psi to about 58,000 psi; 10,000 psi to about 57,000 psi; 10,000 psi to about 56,000 psi; 10,000 psi to about 55,000 psi; 10,000 psi to about 54,000 psi; 10,000 psi to about 53,000 psi; 10,000 psi to about 52,000 psi; 10,000 psi to about 51,000 psi; 10,000 psi to about 50,000 psi; 10,000 psi to about 49,000 psi; 10,000 psi to about 48,000 psi; 10,000 psi to about 47,000 psi; 10,000 psi to about 46,000 psi; 10,000 psi to about 45,000 psi; 10,000 psi to about 44,000 psi; 10,000 psi to about 43,000 psi; 10,000 psi to about 42,000 psi; 10,000 psi to about 41,000 psi; 10,000 psi to about 40,000 psi; 10,000 psi to about 39,000 psi; 10,000 psi to about 38,000 psi; 10,000 psi to about 37,000 psi; 10,000 psi to about 36,000 psi; 10,000 psi to about 35,000 psi; 10,000 psi to about 34,000 psi; 10,000 psi to about 33,000 psi; 10,000 psi to about 32,000 psi; 10,000 psi to about 31,000 psi; 10,000 psi to about 30,000 psi; 10,000 psi to about 29,000 psi; 10,000 psi to about 28,000 psi; 10,000 psi to about 27,000 psi; 10,000 psi to about 26,000 psi; 10,000 psi to about 25,000 psi; 10,000 psi to about 24,000 psi; 10,000 psi to about 23,000 psi; 10,000 psi to about 22,000 psi; 10,000 psi to about 21,000 psi; 10,000 psi to about 20,000 psi; 10,000 psi to about 19,000 psi; 10,000 psi to about 18,000 psi; 10,000 psi to about 17,000 psi; 10,000 psi to about 16,000 psi; 10,000 psi to about 15,000 psi; 10,000 psi to about 14,000 psi; 10,000 psi to about 13,000 psi; 10,000 psi to about 12,000 psi; or 10,000 psi to about 11,000 psi.

The thickness of a machine direction-oriented polymeric film in accordance with the present disclosure may be varied based on a desired end use (e.g., the desired properties and/or applications of the machine direction-oriented polymeric film). In one example, the thickness ranges from about 0.2 mil to about 3.0 mil. In another example, the thickness ranges from about 0.3 mil to about 2.5 mil. In illustrative embodiments, the thickness is less than about 2.0 mil, in some examples less than about 1.5 mil, in some examples less than about 1.0 mil, in some examples less than about 0.9 mil, in some examples less than about 0.8 mil, in some examples less than about 0.7 mil, in some examples less than about 0.6 mil, and in some examples less than about 0.5 mil. Although thicknesses outside this range may also be employed (e.g., thicknesses above about 3.0 mil), lower thicknesses minimize material cost. The thickness of a machine direction-oriented polymeric film in accordance with the present disclosure may be one of several different values or fall within one of several different ranges. For example, it is within the scope of the present disclosure to select a thickness to be less than or equal to one of the following values: about 3.0 mil, 2.9 mil, 2.8 mil, 2.7 mil, 2.6 mil, 2.5 mil, 2.4 mil, 2.3 mil, 2.2 mil, 2.1 mil, 2.0 mil, 1.9 mil, 1.8 mil, 1.7 mil, 1.6 mil, 1.5 mil, 1.4 mil, 1.3 mil, 1.2 mil, 1.1 mil, 1.0 mil, 0.9 mil, 0.8 mil, 0.7 mil, 0.6 mil, 0.5 mil, or 0.4 mil.

It is also within the scope of the present disclosure for the thickness of the machine direction-oriented polymeric film to fall within one of many different ranges. In a first set of ranges, the thickness of the machine direction-oriented polymeric film is in one of the following ranges: about 0.2 mil to 3.0 mil, 0.3 mil to 2.9 mil, 0.4 mil to 2.8 mil, 0.5 mil to 2.7 mil, 0.6 mil to 2.6 mil, 0.7 mil to 2.5 mil, 0.8 mil to 2.4 mil, 0.9 mil to 2.3 mil, 1.0 mil to 2.2 mil, 1.1 mil to 2.1 mil, 1.2 mil to 2.0 mil, 1.3 mil to 1.9 mil, 1.4 mil to 1.8 mil, or 1.5 mil to 1.7 mil. In a second set of ranges, the thickness of the machine direction-oriented polymeric film is in one of the following ranges: about 0.3 mil to 3.0 mil, 0.4 mil to 3.0 mil, 0.5 mil to 3.0 mil, 0.6 mil to 3.0 mil, 0.7 mil to 3.0 mil, 0.8 mil to 3.0 mil, 0.9 mil to 3.0 mil, 1.0 mil to 3.0 mil, 1.1 mil to 3.0 mil, 1.2 mil to 3.0 mil, 1.3 mil to 3.0 mil, 1.4 mil to 3.0 mil, 1.5 mil to 3.0 mil, 1.6 mil to 3.0 mil, 1.7 mil to 3.0 mil, 1.8 mil to 3.0 mil, 1.9 mil to 3.0 mil, 2.0 mil to 3.0 mil, 2.1 mil to 3.0 mil, 2.2 mil to 3.0 mil, 2.3 mil to 3.0 mil, 2.4 mil to 3.0 mil, 2.5 mil to 3.0 mil, 2.6 mil to 3.0 mil, 2.7 mil to 3.0 mil, 2.8 mil to 3.0 mil, or 2.9 mil to 3.0 mil. In a third set of ranges, the thickness of the machine direction-oriented polymeric film is in one of the following ranges: about 0.3 mil to 2.9 mil, 0.3 mil to 2.8 mil, 0.3 mil to 2.7 mil, 0.3 mil to 2.6 mil, 0.3 mil to 2.5 mil, 0.3 mil to 2.4 mil, 0.3 mil to 2.3 mil, 0.3 mil to 2.2 mil, 0.3 mil to 2.1 mil, 0.3 mil to 2.0 mil, 0.3 mil to 1.9 mil, 0.3 mil to 1.8 mil, 0.3 mil to 1.7 mil, 0.3 mil to 1.6 mil, 0.3 mil to 1.5 mil, 0.3 mil to 1.4 mil, 0.3 mil to 1.3 mil, 0.3 mil to 1.2 mil, 0.3 mil to 1.1 mil, 0.3 mil to 1.0 mil, 0.3 mil to 0.9 mil, 0.3 mil to 0.8 mil, 0.3 mil to 0.7 mil, 0.3 mil to 0.6 mil, 0.3 mil to 0.5 mil, or 0.3 mil to 0.4 mil.

Machine direction-oriented polymeric films of a type described above are not limited to any specific kind of film structure. Other film structures may achieve the same or similar result as the A-B-A three-layer film 2 shown in FIG. 1 or the A-C-B-C-A five-layer structure 24 shown in FIGS. 3 and 4. Film structure is a function of equipment design and capability. For example, the number of layers in a film depends only on the technology available and the desired end use for the film. Representative examples of film structures in accordance with the present disclosure that may be implemented using a blown film process include but are not limited to the following:

A-B-C
A-B-C-D
A-B-C-D-E
A-B-C-D-E-F
A-B-C-D-E-F-G
A-B-C-D-E-F-G-H
A-B-C-D-E-F-G-H-I
A-B-C-D-E-F-G-H-I-J
A-B-C-D-E-F-G-H-I-J-K
A-B-C-D-E-F-G-H-I-J-K-L
A-B-C-D-E-F-G-H-I-J-K-L-M

In the representative examples of blown film structures shown above, it is to be understood that any two or more of the individual layers—even though they may be designated by different letters—may in fact contain identical compositions. By way of example, a three-layer blown film structure designated as A-B-C in the scheme above includes both a structure in which the A and C layers have identical compositions as well as a structure in which the A and C layers have different compositions.

Representative examples of film structures in accordance with the present disclosure that may be implemented in a cast film process include but are not limited to the following:

A-B-A
A-A-B-A
A-B-A-A
A-A-B-A-A
A-B-A-A-A
A-B-A-B-A
A-B-A-A-A-A-A
A-A-B-A-A-A-A
A-A-A-B-A-A-A
A-B-A-A-A-B-A
A-B-A-A-B-A-A
A-B-A-B-A-A-A
A-B-A-B-A-B-A
A-B-A-A-A-A-A-A
A-A-B-A-A-A-A-A
A-A-A-B-A-A-A-A
A-B-A-A-A-A-B-A
A-C-B-C-A
A-C-A-C-B-C-A

A-C-B-C-A-C-A
A-C-A-C-B-C-A-C-A
A-C-B-C-A-C-A-C-A
A-C-B-C-A-B-C-A.

Additionally, die technology that allows production of multiple layers in a multiplier fashion may be used. For example, an ABA structure may be multiplied from about 10 to about 1000 times. The resulting 10-time multiplied ABA structure may be expressed as follows:

A-B-A-A-B-A-A-B-A-A-B-A-A-B-A-A-B-A-A-B-A-A-B-A-A-B-A-A-B-A

Representative applications using a machine direction-oriented polymeric film in accordance with the present disclosure include but are not limited to packaging applications (e.g., stand-up pouches, pillow pouches, bags, container lidding, and/or the like). The presence of high density polyethylene in one or both skin layers of a machine direction-oriented polymeric film in accordance with the present disclosure facilitates the use of higher temperatures during the sealing process of a packaging container (e.g., a flexible pouch), which in turn facilitates strong seal formation in the finished package. By way of example, the sealing process may utilize temperatures up to the melt temperature of the skin layer (in illustrative embodiments, 5-10° below the melt temperature).

Machine direction-oriented polymeric films in accordance with the present disclosure may be laminated, bonded, or otherwise adhered to sealant webs and/or moisture barrier webs (with or without oxygen barrier). Adhesive bonding may be used to prepare such laminates. Adhesive bonding may be performed with adhesive agents including but not limited to powders, adhesive webs, liquid adhesives, hot-melt adhesives, solvent-based adhesives, solvent-less adhesives, aqueous adhesives, polymeric adhesives (e.g., extrusion lamination), and the like. Additionally, these types of support may be used with ultrasonic bonding, thermal bonding, or thermal lamination if the polymers in the support are compatible with the film surface.

The following examples and representative procedures illustrate features in accordance with the present disclosure, and are provided solely by way of illustration. They are not intended to limit the scope of the appended claims or their equivalents.

EXAMPLES

Example 1—Formulations for Machine Direction-Oriented Polymeric Film

In this experiment, five-layered precursor films were made using a blown film process and later subjected to MD orientation to form machine direction-oriented polymeric films in accordance with the present disclosure. The five-layered precursor films were made from the formulations X16-262A shown in Table 1 and X17-045A shown in Table 2.

TABLE 1

Composition of X16-262A.

| EXTRUDER | Layer % (Total) | COMPONENT | Amount of Component (Weight %) |
|---|---|---|---|
| A | 25.0 | M6020SB (Lyondell Basell, ALATHON ® nucleated HDPE) | 100.0 |

TABLE 1-continued

Composition of X16-262A.

| EXTRUDER | Layer % (Total) | COMPONENT | Amount of Component (Weight %) |
|---|---|---|---|
| B | 10.0 | 1018HA (ExxonMobil, EXCEED ® mLLDPE-C6) | 100.0 |
| C | 20.0 | M6020SB (Lyondell Basell, ALATHON ® HDPE) | 100.0 |
| D | 10.0 | 1018HA (ExxonMobil, EXCEED ® mLLDPE-C6) | 100.0 |
| E | 35.0 | M6020SB (Lyondell Basell, ALATHON ® nucleated HDPE) | 100.0 |

The physical properties of a machine direction-oriented polymeric film made from a precursor film derived from composition X16-262A and having an initial gauge of 5.0 mil prior to being stretched in a machine direction at a draw ratio of 5.8 to 1 are shown in Table 3. In Table 3, Elmendorf tear results that are below the assay range of the equipment are indicated by an asterisk and should be regarded as being for reference only. Puncture probes meeting ASTM D 7192-10 specs, deployed on Apr. 26, 2012, usually require less force to puncture materials than earlier versions of the probes.

TABLE 2

Composition of X17-045A.

| EXTRUDER | Layer % (Total) | COMPONENT | Amount of Component (Weight %) |
|---|---|---|---|
| A | 25.0 | M6020SB (Lyondell Basell, ALATHON ® nucleated HDPE) | 100.0 |
| B | 10.0 | 3132 (ExxonMobil, EXACT ® POP-C6) | 100.0 |
| C | 20.0 | M6020SB (Lyondell Basell, ALATHON ® HDPE) | 100.0 |
| D | 10.0 | 3132 (ExxonMobil, EXACT ® POP-C6) | 100.0 |
| E | 35.0 | M6020SB (Lyondell Basell, ALATHON ® nucleated HDPE) | 100.0 |

The physical properties of a machine direction-oriented polymeric film made from a precursor film derived from composition of X17-045A and having an initial gauge of 5.0 mil prior to being stretched in a machine direction at a draw ratio of either 6.0:1 or 6.5:1 are shown in Table 3.

TABLE 3

Physical Properties of Machine Direction-Oriented Polymeric Films.

| Physical Property | Formulation (Draw Ratio) Units | X17-045A (6.5:1) A | X17-045A (6.0:1) B | X16-262A (5.8:1) C |
|---|---|---|---|---|
| Gauge | mil | 0.82 | 0.81 | 0.86 |
| Haze | % | 4.8 | 5.3 | 9.9 |
| Gloss - In | % @ 45° | 83.8 | 78.0 | 65.8 |
| Gloss - Out | % @ 45° | 81.7 | 77.6 | 67.2 |
| COF, Static - In\In | — | 0.347 | 0.548 | 0.333 |
| COF, Static - Out\Out | — | 0.400 | 0.335 | 0.548 |
| COF, Kinetic - In\In | — | 0.360 | 0.418 | 0.343 |
| COF, Kinetic - Out\Out | — | 0.413 | 0.336 | 0.398 |
| WVTR 3/31 mil | mil | 0.76 | 0.81 | 0.96 |
| WVTR 3/31 | g/100 in$^2$/day | 0.284 | 0.279 | 0.208 |
| WVTR/mil | g/100 in$^2$/day | 0.194 | 0.202 | 0.178 |
| OTR 2/20H mil | mil | — | — | — |
| OTR 2/20H | cc/100 in$^2$/day | — | — | — |
| OTR 2/20T mil | mil | 0.74 | 0.84 | 0.88 |
| ††OTR 2/20T | cc/100 in$^2$/day | 98 | 104 | 78 |
| Tensile Gauge MD | mil | 0.83 | 0.82 | 0.90 |
| Stress @ Peak MD | PSI | 40,493 | 38,321 | 31,665 |
| Strain @ Peak MD | % | 17 | 20 | 19 |
| Stress @ Break MD | PSI | 40,044 | 31,640 | 28,850 |
| Strain @ Break MD | % | 18 | 28 | 23 |
| Stress @ Yield MD | PSI | 23,302 | 21,288 | 17,722 |
| Strain @ Yield MD | % | 7 | 7 | 7 |
| Stress @ 5% Strain MD | PSI | 19,003 | 16,190 | 14,436 |
| Stress @ 10% Strain MD | PSI | 31,353 | 27,137 | 23,724 |
| Stress @ 25% Strain MD | PSI | 0 | 35,343 | 27,107 |
| Stress @ 50% Strain MD | PSI | 0 | 0 | 0 |
| Stress @ 100% Strain MD | PSI | 0 | 0 | 0 |
| Secant Modulus MD (1%) | PSI | 402,012 | 361,240 | 307,200 |
| Trouser Tear MD | gf | 155 | 181 | 195 |
| TEA MD | FtLb/in$^2$ | 8 | 13 | 9 |
| Graves Tear MD | gf | 184 | 147 | 277 |
| Elmendorf Tear MD Arm | g | 200 | 200 | 200 |
| ††††Elmendorf Tear MD | gf | 37.2* | 35.8* | 8* |
| Tensile Gauge TD | mil | 0.80 | 0.84 | 1.05 |
| Stress @ Peak TD | PSI | 3,877 | 4,871 | 4,346 |
| Strain @ Peak TD | % | 3 | 3 | 3 |
| Stress @ Break TD | PSI | 3,877 | 4,871 | 4,346 |
| Strain @ Break TD | % | 3 | 3 | 3 |
| Stress @ Yield TD | PSI | 0 | 0 | 0 |
| Strain @ Yield TD | % | 0 | 0 | 0 |
| Stress @ 5% Strain TD | PSI | 0 | 0 | 0 |
| Stress @ 10% Strain TD | PSI | 0 | 0 | 0 |
| Stress @ 25% Strain TD | PSI | 0 | 0 | 0 |
| Stress @ 50% Strain TD | PSI | 0 | 0 | 0 |
| Stress @ 100% Strain TD | PSI | 0 | 0 | 0 |
| Secant Modulus TD (1%) | PSI | 294,024 | 304,877 | 254,340 |
| Trouser Tear TD | gf | 227 | 268 | 312 |
| TEA TD | FtLb/in$^2$ | 0 | 0 | 0 |
| Graves Tear TD | gf | 1,175 | 1,098 | 1,102 |
| Elmendorf Tear TD Arm | g | 400 | 800 | 800 |
| Elmendorf Tear TD | gf | 187 | 297 | 355 |
| Dart Drop (26") | g | — | — | — |
| § Slow Puncture - ⅛" (Kraft) | gf | 349 | 322 | 357 |

As shown by the data in Table 3, a representative machine direction-oriented polymeric film in accordance with the present disclosure shows low elongation (as exemplified by "Strain @ Break MD"), high stiffness (as exemplified by "Secant Modulus MD (1%)"), low haze, high gloss, and high tensile properties (as exemplified by "Stress @ Break MD"). However, surprisingly and unexpectedly, the moisture barrier properties of the polymeric film (as exemplified by "WVTR/mil") were higher than would have been expected based on the good barrier properties of the HDPE-containing skin layer and the fact that it received stretching.

Example 2—Additional Formulation for Machine Direction-Oriented Polymeric Film

In this experiment, a five-layered precursor film was made using a blown film process and later subjected to MD orientation to form a machine direction-oriented polymeric film in accordance with the present disclosure. The five-layered precursor film was made from the formulation X18-151A shown in Table 4.

TABLE 4

Composition of X18-151A.

| EXTRUDER | Layer % (Total) | COMPONENT | Amount of Component (Weight %) |
|---|---|---|---|
| A | 25.0 | L5885 (Lyondell Basell, ALATHON ® HDPE) | 100.0 |
| B | 10.0 | 1018HA (ExxonMobil, EXCEED ® mLLDPE-C6) | 100.0 |

TABLE 4-continued

Composition of X18-151A.

| EXTRUDER | Layer % (Total) | COMPONENT | Amount of Component (Weight %) |
|---|---|---|---|
| C | 20.0 | L5885 (Lyondell Basell, ALATHON ® HDPE) | 100.0 |
| D | 10.0 | 1018HA (ExxonMobil, EXCEED ® mLLDPE-C6) | 100.0 |
| E | 35.0 | L5885 (Lyondell Basell, ALATHON ® HDPE) | 100.0 |

The physical properties of a machine direction-oriented polymeric film made from a precursor film derived from composition X18-151A and having an initial gauge of 5.75 mil prior to being stretched in a machine direction at a draw ratio of 6.5 to 1 are shown below in Table 5.

TABLE 5

Physical Properties of Additional Machine Direction-Oriented Polymeric Film.

| Physical Property | Units | Formulation (Draw Ratio) X18-151A (6.5:1) D |
|---|---|---|
| Basis Weight (avg. 5) | g/m² | 25.06 |
| Haze | % | 18 |
| Gloss | % @ 45° | 38 |
| Density (avg. 10) | g/cc | 0.9520 |
| Light Transmission (avg. 3) | % | 92.3 |
| COF (avg. 3), Static - Seal\Seal | — | 0.277 |
| COF (avg. 3), Static - Nonseal\Nonseal | — | 0.278 |
| COF (avg. 3), Kinetic - Seal\Seal | — | 0.280 |
| COF (avg. 3), Kinetic - Nonseal\Nonseal | — | 0.280 |
| Tensile Gauge MD (avg. 5) | mil | 0.99 |
| Stress @ Peak MD (avg. 5) | PSI | 33,645 |
| Strain @ Peak MD (avg. 5) | % | 24 |
| Stress @ Break MD (avg. 5) | PSI | 27,986 |
| Strain @ Break MD (avg. 5) | % | 36 |
| Stress @ Yield MD (avg. 5) | PSI | 16,937 |
| Strain @ Yield MD (avg. 5) | % | 8 |
| Stress @ 5% Strain MD (avg. 5) | PSI | 10,677 |
| Stress @ 10% Strain MD (avg. 5) | PSI | 20,059 |
| Stress @ 25% Strain MD (avg. 5) | PSI | 33,499 |
| Stress @ 50% Strain MD (avg. 5) | PSI | 0 |
| Stress @ 100% Strain MD (avg. 5) | PSI | 0 |
| Secant Modulus MD (1%) (avg. 5) | PSI | 347,933 |
| TEA MD (avg. 5) | in · lbf | 17 |
| Elmendorf Tear MD Arm | g | 400 |
| Elmendorf Tear MD (avg. 5) | gf | 106 |
| Tensile Gauge TD (avg. 5) | mil | 1.00 |
| Stress @ Peak TD (avg. 5) | PSI | 5,259 |
| Strain @ Peak TD (avg. 5) | % | 4 |
| Stress @ Break TD (avg. 5) | PSI | 5,259 |
| Strain @ Break TD (avg. 5) | % | 4 |
| Stress @ Yield TD (avg. 5) | PSI | 3,946 |
| Strain @ Yield TD (avg. 5) | % | 3 |
| Stress @ 5% Strain TD (avg. 5) | PSI | 2,602 |
| Stress @ 10% Strain TD (avg. 5) | PSI | 0 |
| Stress @ 25% Strain TD (avg. 5) | PSI | 0 |
| Stress @ 50% Strain TD (avg. 5) | PSI | 0 |
| Stress @ 100% Strain TD (avg. 5) | PSI | 0 |
| Secant Modulus TD (1%) (avg. 5) | PSI | 291,675 |
| TEA TD (avg. 5) | in · lbf | 0 |
| Elmendorf Tear TD Arm | g | 400 |
| Elmendorf Tear TD (avg. 5) | gf | 258 |
| § Slow Puncture (avg. 5) - ⅛" (Kraft) | gf | 558 |
| § Slow Puncture (avg. 5) - ¼" (D3) | gf | 732 |

Example 3—Formulation for Machine Direction-Oriented Polymeric Film with Oxygen Barrier Properties In this experiment, a nine-layered precursor film was made using a blown film process and later subjected to MD orientation to form machine direction-oriented polymeric films in accordance with the present disclosure. The nine-layered precursor film was made from the formulations X18-214A-5.5T shown in Table 6.

TABLE 6

Composition of X18-214A-5.5T.

| EXTRUDER | Layer % (Total) | COMPONENT | Amount of Component (Weight %) |
|---|---|---|---|
| A | 16.5 | M6020SB (Lyondell Basell, ALATHON ® HDPE) | 100.0 |
| B | 14.0 | 5960G1 (Dow Chemical Company, ELITE ® HDPEm) | 90.0 |
|  |  | 3000RTN (Dow Chemical Company, RETAIN ® MAH Graft) | 10.0 |
| C | 10.0 | 1018HA (ExxonMobil, EXCEED ® mLLDPE-C6) | 89.0 |
|  |  | 3000RTN (Dow Chemical Company, RETAIN ® MAH Graft) | 11.0 |
| D | 7.0 | 1018HA (ExxonMobil, EXCEED ® mLLDPE-C6) | 85.0 |
|  |  | 41E710 (DuPont, BYNEL ® anhydride-modified, linear low-density polyethylene) | 15.0 |
| E | 5.0 | DC3203J (Soarus LLC, SOARNOL ® EVOH 32%) | 100.0 |
| F | 7.0 | 1018HA (ExxonMobil, EXCEED ® mLLDPE-C6) | 85.0 |
|  |  | 41E710 (DuPont, BYNEL ® anhydride-modified, linear low-density polyethylene) | 15.0 |
| G | 10.0 | 1018HA (ExxonMobil, EXCEED ® mLLDPE-C6) | 89.0 |
|  |  | 3000RTN (Dow Chemical Company, RETAIN ® MAH Graft) | 11.0 |
| H | 14.0 | 5960G1 (Dow Chemical Company, ELITE ® HDPEm) | 90.0 |
|  |  | 3000RTN (Dow Chemical Company, RETAIN ® MAH Graft) | 10.0 |
| I | 16.5 | M6020SB (Lyondell Basell, ALATHON ® HDPE) | 100.0 |

Example 4—Additional Formulation for Machine Direction-Oriented Polymeric Film

In this experiment, a five-layered precursor film having nucleated HDPE skin layers was made using a blown film process and later subjected to MD orientation to form machine direction-oriented polymeric films in accordance with the present disclosure. The five-layered precursor film was made from the formulation X18-202A shown in Table 7.

TABLE 7

Composition of X18-202A.

| EXTRUDER | Layer % (Total) | COMPONENT | Amount of Component (Weight %) |
|---|---|---|---|
| A | 25.0 | M6020SB (Lyondell Basell, ALATHON ® nucleated HDPE) | 100.0 |
| B | 10.0 | 8656ML (ExxonMobil, EXCEED ® XP LLDPE) | 100.0 |
| C | 20.0 | L5885 (Lyondell Basell, ALATHON ® HDPE) | 100.0 |
| D | 10.0 | 8656ML (ExxonMobil, EXCEED ® XP LLDPE) | 100.0 |
| E | 35.0 | M6020SB (Lyondell Basell, ALATHON ® nucleated HDPE) | 100.0 |

The physical properties of a machine direction-oriented polymeric film made from a precursor film derived from composition X18-202A and having an initial gauge of 5.75 mil prior to being stretched in a machine direction at a draw ratio of 6 to 1 are shown below in Table 8.

TABLE 8

Physical Properties of Additional Machine Direction-Oriented Polymeric Film.

| Physical Property | Formulation (Draw Ratio) Units | X18-202A (6:1) E |
|---|---|---|
| Gauge (avg. 5) | mil | 0.89 |
| Basis Weight (avg. 5) | g/m² | 21.65 |
| Density (avg. 10) | g/cc | 0.9472 |
| Clarity (avg. 3) | % | 95.0 |
| Haze (avg. 3) | % | 5.0 |
| Gloss (avg. 3) - In | % @ 45° | 126.4 |
| Gloss (avg. 3) - Out | % @ 45° | 115.3 |
| COF (avg. 3), Static - In\In | — | 0.398 |
| COF (avg. 3), Static - Out\Out | — | 0.420 |
| COF (avg. 3), Kinetic - In\In | — | 0.375 |
| COF (avg. 3), Kinetic - Out\Out | — | 0.362 |
| WVTR 3/31 mil (avg. 2) | mil | 1.01 |
| WVTR 3/31 (avg. 2) | g/100 in²/day | 0.346 |
| Tensile Gauge MD (avg. 5) | mil | 0.89 |
| Stress @ Peak MD (avg. 5) | PSI | 36,344 |
| Strain @ Peak MD (avg. 5) | % | 19 |
| Stress @ Break MD (avg. 5) | PSI | 36,173 |
| Strain @ Break MD (avg. 5) | % | 20 |
| Stress @ Yield MD (avg. 5) | PSI | 20,594 |
| Strain @ Yield MD (avg. 5) | % | 7 |
| Stress @ 5% Strain MD (avg. 5) | PSI | 15,743 |
| Stress @ 10% Strain MD (avg. 5) | PSI | 25,940 |
| Stress @ 25% Strain MD (avg. 5) | PSI | 0 |
| Stress @ 50% Strain MD (avg. 5) | PSI | 0 |
| Stress @ 100% Strain MD (avg. 5) | PSI | 0 |
| Secant Modulus MD (1%) (avg. 5) | PSI | 394,930 |
| TEA MD (avg. 5) | in·lbf | 9 |
| Elmendorf Tear MD Arm | g | 200 |
| Elmendorf Tear MD (avg. 5) | gf | 64 |
| Tensile Gauge TD (avg. 5) | mil | 0.88 |
| Stress @ Peak TD (avg. 5) | PSI | 5,240 |
| Strain @ Peak TD (avg. 5) | % | 3 |
| Stress @ Break TD (avg. 5) | PSI | 5,240 |
| Strain @ Break TD (avg. 5) | % | 3 |
| Stress @ Yield TD (avg. 5) | PSI | 0 |
| Strain @ Yield TD (avg. 5) | % | 0 |
| Stress @ 5% Strain TD (avg. 5) | PSI | 0 |
| Stress @ 10% Strain TD (avg. 5) | PSI | 0 |
| Stress @ 25% Strain TD (avg. 5) | PSI | 0 |
| Stress @ 50% Strain TD (avg. 5) | PSI | 0 |
| Stress @ 100% Strain TD (avg. 5) | PSI | 0 |
| Secant Modulus TD (1%) (avg. 5) | PSI | 285,761 |
| TEA TD (avg. 5) | in·lbf | 0 |
| Elmendorf Tear TD Arm | g | 800 |
| Elmendorf Tear TD (avg. 5) | gf | 246 |
| § Slow Puncture (avg. 5) - ⅛" (Kraft) | gf | 330 |
| § Slow Puncture (avg. 5) - ¼" (D3) | gf | 656 |

As shown by the data in Table 5 and Table 8, the gloss measured for a film containing nucleated HDPE skin layers (e.g., the film E shown in Table 8) is substantially higher than the gloss measured for a film containing non-nucleated skin layers (e.g., the film D shown in Table 5).

Example 5—Additional Formulation for Machine Direction-Oriented Polymeric Film

In this experiment, a five-layered precursor film having one nucleated HDPE skin layer was made using a blown film process and later subjected to MD orientation to form machine direction-oriented polymeric films in accordance with the present disclosure. The five-layered precursor film was made from the formulation X19-126B shown in Table 9.

TABLE 9

Composition of X19-126B.

| EXTRUDER | Layer % (Total) | COMPONENT | Amount of Component (Weight %) |
|---|---|---|---|
| A | 15.0 | M6020SB (Lyondell Basell, ALATHON ® nucleated HDPE) | 84.0 |
|  |  | 5400G (DOW ELITE ™ mLLDPE-C8) | 15.0 |
|  |  | AMF705HF (A. Schulman/LYB Polybatch PPA) | 1.0 |
| B | 20.0 | 5940ST (DOW ELITE ™ mLMDPE-C8) | 100.0 |
| C | 30.0 | 5400G (DOW ELITE ™ mLLDPE-C8) | 100.0 |

TABLE 9-continued

Composition of X19-126B.

| EXTRUDER | Layer % (Total) | COMPONENT | Amount of Component (Weight %) |
|---|---|---|---|
| D | 20.0 | 5940ST (DOW ELITE ™ mLMDPE-C8) | 100.0 |
| E | 15.0 | 5960G1 (DOW ELITE ™ HDPEm) | 99.0 |
|   |   | AMF705HF (A. Schulman/LYB Polybatch PPA) | 1.0 |

Example 6—Additional Formulation for Machine Direction-Oriented Polymeric Film

In this experiment, a five-layered precursor film having two nucleated HDPE skin layers was made using a blown film process and later subjected to MD orientation to form machine direction-oriented polymeric films in accordance with the present disclosure. The five-layered precursor film was made from the formulation X19-045A.1 shown in Table 10.

TABLE 10

Composition of X19-045A.1.

| EXTRUDER | Layer % (Total) | COMPONENT | Amount of Component (Weight %) |
|---|---|---|---|
| A | 15.0 | M6020SB (Lyondell Basell, ALATHON ® nucleated HDPE) | 100.0 |
| B | 30.0 | 5940ST (DOW ELITE ™ mLMDPE-C8) | 100.0 |
| C | 10.0 | PL1850G (DOW AFFINITY ™ POP) | 98.0 |
|   |   | AMF705HF (A. Schulman/LYB Polybatch PPA) | 2.0 |
| D | 30.0 | 5940ST (DOW ELITE ™ mLMDPE-C8) | 100.0 |
| E | 15.0 | M6020SB (Lyondell Basell, ALATHON ® nucleated HDPE) | 100.0 |

The physical properties of a machine direction-oriented polymeric film made from a precursor film derived from composition X19-045A and having an initial gauge of 5.25 mil prior to being stretched in a machine direction at a draw ratio of 5.8 to 1 are shown below in Table 11.

TABLE 11

Physical Properties of Additional Machine Direction-Oriented Polymeric Film.

| Physical Property | Units | Formulation (Draw Ratio) X19-045A.1 (5.8:1) F |
|---|---|---|
| Gauge (avg. 5) | mil | 0.98 |
| Basis Weight (avg. 5) | g/m² | 23.05 |
| Clarity (avg. 3) | % | 98.3 |
| Haze (avg. 3) | % | 4.5 |
| Gloss (avg. 3) - In | % @ 45° | 80.6 |
| Gloss (avg. 3) - Out | % @ 45° | 79.6 |
| COF (avg. 3), Static - In\In | — | 0.480 |
| COF (avg. 3), Static - Out\Out | — | 0.403 |
| COF (avg. 3), Kinetic - In\In | — | 0.395 |
| COF (avg. 3), Kinetic - Out\Out | — | 0.374 |
| WVTR 3/31 mil (avg. 2) | mil | 0.96 |
| WVTR 3/31 (avg. 2) | g/100 in²/day | 0.524 |
| Heat Shrink MD (avg. 3) 100 C. 30 sec | % | 3 |
| Heat Shrink TD (avg. 3) 100 C. 30 sec | % | 0 |
| Tensile Gauge MD (avg. 5) | mil | 0.97 |
| Stress @ Peak MD (avg. 5) | PSI | 19,484 |
| Strain @ Peak MD (avg. 5) | % | 44 |
| Stress @ Break MD (avg. 5) | PSI | 19,365 |
| Strain @ Break MD (avg. 5) | % | 51 |
| Stress @ Yield MD (avg. 5) | PSI | 6,687 |
| Strain @ Yield MD (avg. 5) | % | 4 |
| Stress @ 5% Strain MD (avg. 5) | PSI | 8,845 |
| Stress @ 10% Strain MD (avg. 5) | PSI | 14,681 |
| Stress @ 25% Strain MD (avg. 5) | PSI | 18,988 |
| Stress @ 50% Strain MD (avg. 5) | PSI | 19,173 |
| Stress @ 100% Strain MD (avg. 5) | PSI | 0 |
| Secant Modulus MD (1%) (avg. 5) | PSI | 196,851 |
| TEA MD (avg. 5) | in·lbf | 17 |
| Elmendorf Tear MD Arm | g | 400 |
| Elmendorf Tear MD (avg. 5) | gf | 116 |
| Tensile Gauge TD (avg. 5) | mil | 0.96 |
| Stress @ Peak TD (avg. 5) | PSI | 3,941 |
| Strain @ Peak TD (avg. 5) | % | 5 |
| Stress @ Break TD (avg. 5) | PSI | 2,270 |
| Strain @ Break TD (avg. 5) | % | 291 |
| Stress @ Yield TD (avg. 5) | PSI | 3,813 |
| Strain @ Yield TD (avg. 5) | % | 4 |
| Stress @ 5% Strain TD (avg. 5) | PSI | 3,922 |
| Stress @ 10% Strain TD (avg. 5) | PSI | 3,355 |
| Stress @ 25% Strain TD (avg. 5) | PSI | 2,325 |
| Stress @ 50% Strain TD (avg. 5) | PSI | 1,924 |
| Stress @ 100% Strain TD (avg. 5) | PSI | 1,998 |
| Secant Modulus TD (1%) (avg. 5) | PSI | 170,401 |
| TEA TD (avg. 5) | in·lbf | 12 |
| Elmendorf Tear TD Arm | g | 1,600 |
| Elmendorf Tear TD (avg. 5) | gf | 510 |
| Puncture (avg. 5) - 1/16" | gf | 783 |
| Puncture (avg. 5) - 1/8" | gf | 880 |

The process conditions for preparing the film F having the properties shown in Table 11 are summarized below in Table 12. The extruder rate was 500 kg/hour, the draw ratio was 5.8:1, the stretch gap was 60 mm, and the finished gauge was 0.9 mil.

TABLE 12

Inline MDO Process Conditions for Preparing Film Made from the Formulation X19-045A.1

| Roll | Temperature (C) | Speed (m/min) | Tension (N) | Factor |
|---|---|---|---|---|
| Preheat 1 | 120 | 33 | 230 |   |
| Preheat 2 | 120 | 35.2 |   | 1.07 |
| Preheat 3 | 120 | 36.6 |   | 1.04 |
| Preheat 4 | 120 | 38.4 |   | 1.05 |
| Slow Draw | 120 | 40.9 |   | 1.06 |
| Fast Draw | 120 | 175 |   | 4.3 |
| Annealing 1 | 120 | 171.7 |   | 0.98 |
| Annealing 2 | 120 | 195 | 51 |   |

TABLE 12-continued

Inline MDO Process Conditions for Preparing Film Made from the Formulation X19-045A.1

| Roll | Temperature (C) | Speed (m/min) | Tension (N) | Factor |
|---|---|---|---|---|
| Cooling 1 | 85 | 194.2 | 60 | |
| Cooling 2 | 85 | 192.7 | 50 | |

Additional features and advantages of the present teachings can be described by the embodiments set forth in any of the following enumerated clauses. It is to be understood that any of the embodiments described herein can be used in connection with any other embodiments described herein to the extent that the embodiments do not contradict one another.

1. A machine direction-oriented polymeric film comprising
   a first skin layer comprising polyethylene and a first nucleating agent,
   a core layer comprising polyethylene, and
   a second skin layer comprising polyethylene,
   wherein the machine direction-oriented polymeric film has a strain at break in a machine direction of less than about 300%, a 45 degree gloss of greater than about 30%, and a haze of less than about 30%.

2. The machine direction-oriented polymeric film of clause 1 wherein the polyethylene of the first skin layer, the polyethylene of the core layer, and the polyethylene of the second skin layer are each independently selected from the group consisting of high density polyethylene, low density polyethylene, linear low density polyethylene, medium density polyethylene, ultra-low density polyethylene, and a combination thereof.

3. The machine direction-oriented polymeric film of clause 1 or clause 2 wherein the polyethylene of the first skin layer comprises high density polyethylene.

4. The machine direction-oriented polymeric film of any one of the preceding clauses wherein the polyethylene of the first skin layer and the polyethylene of the second skin layer each comprise high density polyethylene.

5. The machine direction-oriented polymeric film of any one of the preceding clauses wherein the second skin layer further comprises a second nucleating agent.

6. The machine direction-oriented polymeric film of any one of the preceding clauses wherein the first nucleating agent and the second nucleating agent are the same.

7. The machine direction-oriented polymeric film of any one of the preceding clauses wherein the first nucleating agent and the second nucleating agent are different.

8. The machine direction-oriented polymeric film of any one of the preceding clauses wherein the nucleating agent comprises from about 0.1% to about 7% by weight of the first skin layer.

9. The machine direction-oriented polymeric film of any one of the preceding clauses wherein the nucleating agent comprises a compound having a formula I

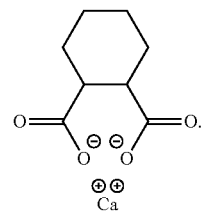

10. The machine direction-oriented polymeric film of any one of the preceding clauses wherein the nucleating agent of the first skin layer comprises from about 0.1% to about 7% by weight of the first skin layer, and the nucleating agent of the second skin layer comprises from about 0.1% to about 7% by weight of the second skin layer.

11. The machine direction-oriented polymeric film of any one of the preceding clauses wherein the core layer further comprises a nucleating agent.

12. The machine direction-oriented polymeric film of any one of the preceding clauses wherein the strain at break in the machine direction is less than about 250%.

13. The machine direction-oriented polymeric film of any one of the preceding clauses wherein the strain at break in the machine direction is less than about 200%.

14. The machine direction-oriented polymeric film of any one of the preceding clauses wherein the strain at break in the machine direction is less than about 150%.

15. The machine direction-oriented polymeric film of any one of the preceding clauses wherein the strain at break in the machine direction is less than about 125%.

16. The machine direction-oriented polymeric film of any one of the preceding clauses wherein the strain at break in the machine direction is less than about 100%.

17. The machine direction-oriented polymeric film of any one of the preceding clauses wherein the strain at break in the machine direction is less than about 90%.

18. The machine direction-oriented polymeric film of any one of the preceding clauses wherein the strain at break in the machine direction is less than about 80%.

19. The machine direction-oriented polymeric film of any one of the preceding clauses wherein the strain at break in the machine direction is less than about 70%.

20. The machine direction-oriented polymeric film of any one of the preceding clauses wherein the strain at break in the machine direction is less than about 60%.

21. The machine direction-oriented polymeric film of any one of the preceding clauses wherein the strain at break in the machine direction is between about 20% and about 60%.

22. The machine direction-oriented polymeric film of any one of the preceding clauses wherein the machine direction-oriented polymeric film has a 45 degree gloss of greater than about 35%.

23. The machine direction-oriented polymeric film of any one of the preceding clauses wherein the machine direction-oriented polymeric film has a 45 degree gloss of greater than about 40%.

24. The machine direction-oriented polymeric film of any one of the preceding clauses wherein the machine direction-oriented polymeric film has a 45 degree gloss of greater than about 50%.

25. The machine direction-oriented polymeric film of any one of the preceding clauses wherein the machine direction-oriented polymeric film has a 45 degree gloss of greater than about 60%.

26. The machine direction-oriented polymeric film of any one of the preceding clauses wherein the machine direction-oriented polymeric film has a 45 degree gloss of greater than about 70%.

27. The machine direction-oriented polymeric film of any one of the preceding clauses wherein the machine direction-oriented polymeric film has a 45 degree gloss of greater than about 80%.

28. The machine direction-oriented polymeric film of any one of the preceding clauses wherein the machine direction-oriented polymeric film has a 45 degree gloss of between about 60% and about 85%.

29. The machine direction-oriented polymeric film of any one of the preceding clauses wherein the machine direction-oriented polymeric film has a 45 degree gloss of less than about 25%.

30. The machine direction-oriented polymeric film of any one of the preceding clauses wherein the machine direction-oriented polymeric film has a haze of less than about 30%.

31. The machine direction-oriented polymeric film of any one of the preceding clauses wherein the haze is less than about 25%.

32. The machine direction-oriented polymeric film of any one of the preceding clauses wherein the haze is less than about 20%.

33. The machine direction-oriented polymeric film of any one of the preceding clauses wherein the haze is less than about 15%.

34. The machine direction-oriented polymeric film of any one of the preceding clauses wherein the haze is less than about 10%.

35. The machine direction-oriented polymeric film of any one of the preceding clauses wherein the haze is less than about 8%.

36. The machine direction-oriented polymeric film of any one of the preceding clauses wherein the haze is between about 3% and about 21%.

37. The machine direction-oriented polymeric film of any one of the preceding clauses wherein the haze is between about 3% and about 6%.

38. The machine direction-oriented polymeric film of any one of the preceding clauses wherein the haze is greater than about 50%.

39. The machine direction-oriented polymeric film of any one of the preceding clauses further comprising a first sub-skin layer interposed between the first skin layer and the core layer, wherein the first sub-skin layer comprises polyethylene.

40. The machine direction-oriented polymeric film of any one of the preceding clauses wherein the polyethylene of the first sub-skin layer is selected from the group consisting of low density polyethylene, high density polyethylene, linear low density polyethylene, ultra-low density polyethylene, and a combination thereof.

41. The machine direction-oriented polymeric film of any one of the preceding clauses wherein the polyethylene of the first sub-skin layer comprises low density polyethylene.

42. The machine direction-oriented polymeric film of any one of the preceding clauses wherein the polyethylene of the first sub-skin layer comprises linear low density polyethylene.

43. The machine direction-oriented polymeric film of any one of the preceding clauses further comprising a first sub-skin layer interposed between the first skin layer and the core layer and a second sub-skin layer interposed between the second skin layer and the core layer, wherein each of the first sub-skin layer and the second sub-skin layer independently comprises a polyethylene.

44. The machine direction-oriented polymeric film of any one of the preceding clauses wherein the polyethylene of the first sub-skin layer and the polyethylene of the second sub-skin layer are each independently selected from the group consisting of low density polyethylene, high density polyethylene, linear low density polyethylene, ultra-low density polyethylene, and a combination thereof.

45. The machine direction-oriented polymeric film of any one of the preceding clauses wherein the polyethylene of the first sub-skin layer and the polyethylene of the second sub-skin layer each independently comprise a low density polyethylene.

46. The machine direction-oriented polymeric film of any one of the preceding clauses wherein the polyethylene of the first sub-skin layer and the polyethylene of the second sub-skin layer each independently comprise a linear low density polyethylene.

47. The machine direction-oriented polymeric film of any one of the preceding clauses wherein the polymeric film has a thickness of less than about 2 mil.

48. The machine direction-oriented polymeric film of any one of the preceding clauses wherein the polymeric film has a thickness of less than about 1.5 mil.

49. The machine direction-oriented polymeric film of any one of the preceding clauses wherein the polymeric film has a thickness of less than about 1 mil.

50. The machine direction-oriented polymeric film of any one of the preceding clauses wherein the first skin layer has a melting point that is greater than or equal to about 115° C.

51. A machine direction-oriented polymeric film comprising
a first skin layer comprising (a) high density polyethylene, medium density polyethylene, linear medium density polyethylene, or a combination thereof, and (b) a first nucleating agent,
a core layer comprising polyethylene,
a first sub-skin layer interposed between the first skin layer and the core layer, the first sub-skin layer comprising polyethylene,
a second skin layer comprising polyethylene, and
a second sub-skin layer interposed between the second skin layer and the core layer, the second sub-skin layer comprising polyethylene,
wherein the machine direction-oriented polymeric film has a strain at break in a machine direction of less than about 300%, a 45 degree gloss of between about 60% and 85%, and a haze of between about 3% and 21%.

52. The machine direction-oriented polymeric film of clause 51 wherein the second skin layer further comprises a second nucleating agent.

53. The machine direction-oriented polymeric film of clause 51 or clause 52 wherein the first nucleating agent and the second nucleating agent are the same.

54. The machine direction-oriented polymeric film of any one of clauses 51-53 wherein the first nucleating agent and the second nucleating agent are different.

55. The machine direction-oriented polymeric film of any one of clauses 51-54 wherein the first nucleating agent comprises from about 0.1% to about 7% by weight of the first skin layer.

56. The machine direction-oriented polymeric film of any one of clauses 51-55 wherein the nucleating agent comprises a compound having a formula I

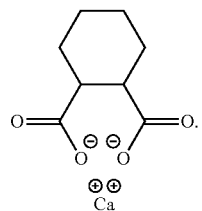

57. The machine direction-oriented polymeric film of any one of clauses 51-56 wherein the first nucleating agent comprises from about 0.1% to about 7% by weight of the first skin layer and the second nucleating agent comprises from about 0.1% to about 7% by weight of the second skin layer.

58. The machine direction-oriented polymeric film of any one of clauses 51-57 wherein the core layer further comprises a nucleating agent.

59. The machine direction-oriented polymeric film of any one of clauses 51-58 wherein the strain at break in the machine direction is less than about 200%.

60. The machine direction-oriented polymeric film of any one of clauses 51-59 wherein the strain at break in the machine direction is less than about 150%.

61. The machine direction-oriented polymeric film of any one of clauses 51-60 wherein the strain at break in the machine direction is less than about 100%.

62. The machine direction-oriented polymeric film of any one of clauses 51-61 wherein the haze is between about 3% and about 6%.

63. The machine direction-oriented polymeric film of any one of clauses 51-62 wherein the first skin layer comprises high density polyethylene.

64. The machine direction-oriented polymeric film of any one of clauses 51-63 wherein the polyethylene of the second skin layer comprises high density polyethylene.

65. The machine direction-oriented polymeric film of any one of clauses 51-64 wherein each of the first skin layer and the second skin layer independently comprises from about 5% to about 45% by weight of the machine direction-oriented polymeric film, wherein each of the first sub-skin layer and the second sub-skin layer independently comprises from about 3% to about 25% by weight of the machine direction-oriented polymeric film, and wherein the core layer comprises from about 10% to about 80% by weight of the machine direction-oriented polymeric film.

66. The machine direction-oriented polymeric film of any one of clauses 51-65 wherein each of the first skin layer and the second skin layer independently comprises from about 10% to about 40% by weight of the machine direction-oriented polymeric film, wherein each of the first sub-skin layer and the second sub-skin layer independently comprises from about 5% to about 20% by weight of the machine direction-oriented polymeric film, and wherein the core layer comprises from about 10% to about 60% by weight of the machine direction-oriented polymeric film.

67. The machine direction-oriented polymeric film of any one of clauses 51-66 wherein the film has a thickness of between about 0.3 mil and about 2.0 mil.

68. The machine direction-oriented polymeric film of any one of clauses 51-67 wherein the film has a thickness of between about 0.4 mil and about 1.25 mil.

69. The machine direction-oriented polymeric film of any one of clauses 51-68 wherein the film has a thickness less than about 1.0 mil.

70. A machine direction-oriented polymeric film comprising
a first skin layer comprising high density polyethylene and a first nucleating agent,
a core layer comprising polyethylene,
a first sub-skin layer interposed between the first skin layer and the core layer, the first sub-skin layer comprising metallocene linear medium density polyethylene,
a second skin layer comprising high density polyethylene, and
a second sub-skin layer interposed between the second skin layer and the core layer, the second sub-skin layer comprising metallocene linear medium density polyethylene,
wherein each of the first skin layer and the second skin layer independently comprises from about 5% to about 45% by weight of the machine direction-oriented polymeric film,
wherein each of the first sub-skin layer and the second sub-skin layer independent comprises from about 3% to about 25% by weight of the machine direction-oriented polymeric film,
wherein the core layer comprises from about 10% to about 80% by weight of the machine direction-oriented polymeric film,
wherein the machine direction-oriented polymeric film has a strain at break in a machine direction of less than about 150%, a 45 degree gloss of between about 60% and 85%, and a haze of between about 3% and 21%, and
wherein the machine direction-oriented polymeric film has a thickness of less than about 1.0 mil.

71. The machine direction-oriented polymeric film of clause 70 wherein the second skin layer further comprises a second nucleating agent, and wherein the first nucleating agent and the second nucleating agent are the same.

72. A packaging article comprising the machine direction-oriented polymeric film of any one of the preceding clauses and a sealant web, wherein the machine direction-oriented polymeric film is laminated to the sealant web.

73. The packaging article of clause 72 wherein the packaging article is selected from the group consisting of a stand-up pouch, a pillow pouch, a bag, and a container lidding.

74. A packaging article comprising the machine direction-oriented polymeric film of any one of any one of the preceding clauses and a moisture barrier web, wherein the machine direction-oriented polymeric film is laminated to the moisture barrier web.

75. The packing article of clause 74 wherein the moisture barrier web has oxygen barrier properties.

76. The packaging article of clause 74 or clause 75 wherein the packaging article is selected from the group consisting of a stand-up pouch, a pillow pouch, a bag, and a container lidding.

77. A process for making a machine direction-oriented polymeric film comprising the steps of
preheating a precursor film at or below a melt temperature of a polymer contained in the precursor film to form a preheated precursor film, the precursor film comprising a first skin layer comprising polyethylene, a core layer comprising polyethylene, and a second skin layer comprising polyethylene,
stretching the preheated precursor film in a machine direction at a draw ratio of greater than or equal to about 5:1 at a temperature at or below the melt temperature of the polymer to form a machine direction-oriented stretched film, and annealing the machine direction-oriented stretched film to form the machine direction-oriented polymeric film.

78. The process of clause 77 wherein the draw ratio is greater than or equal to about 6:1.

79. The process of clause 77 or clause 78 wherein the draw ratio is greater than or equal to about 7:1.

80. The process of any one of clauses 77-79 wherein the draw ratio is greater than or equal to about 8:1.

81. The process of any one of clauses 77-80 wherein the preheating is performed at a temperature between about 200° F. and about 260° F.

82. The process of any one of clauses 77-81 wherein the stretching in the machine direction is performed at a temperature between about 180° F. and about 260° F.

83. The process of any one of clauses 77-82 wherein the annealing is performed at a temperature between about 200° F. and about 260° F.

84. The process of any one of clauses 77-83 wherein the preheating is performed at a temperature between about 200° F. and about 260° F., wherein the stretching in the machine direction is performed at a temperature between about 180° F. and about 260° F., and wherein the annealing is performed at a temperature between about 200° F. and about 260° F.

85. The process of any one of clauses 77-84 further comprising the step of cooling the machine direction-oriented polymeric film after the annealing.

86. The process of any one of clauses 77-85 wherein the cooling is performed at a temperature between about 250° F. and about 70° F.

87. The process of any one of clauses 77-86 further comprising co-extruding at least a first composition, a second composition, and a third composition to form a molten web, the first composition forming the first skin layer, the second composition forming the core layer, and the third composition forming the second skin layer, wherein the first composition and the third composition are identical or different, and quenching the molten web to form the precursor film.

88. The process of any one of clauses 77-87 wherein the co-extruding, quenching, preheating, stretching, and annealing are achieved sequentially in an in-line process.

89. The process of any one of clauses 77-88 wherein the co-extruding and quenching are performed separately from the preheating, stretching, and annealing.

90. A machine direction-oriented polymeric film comprising a first skin layer comprising polyethylene, a core layer comprising an oxygen barrier polymer, a second skin layer comprising polyethylene, a first tie layer interposed between the first skin layer and the core layer, the first tie layer comprising a first tie resin and a second tie layer interposed between the second skin layer and the core layer, the second tie layer comprising a second tie resin, wherein the first tie resin and the second tie resin are the same or different, wherein the machine direction-oriented polymeric film has a strain at break in a machine direction of less than about 100%, and a 1% secant modulus in the machine direction of greater than about 225,000 pounds per square inch.

91. The machine direction-oriented polymeric film of clause 90 wherein the first skin layer comprises medium density polyethylene, linear medium density polyethylene, or a combination thereof.

92. The machine direction-oriented polymeric film of clause 90 or clause 91 wherein the first skin layer comprises high density polyethylene.

93. The machine direction-oriented polymeric film of any one of clauses 90-92 wherein the oxygen barrier polymer comprises ethylene vinyl alcohol (EVOH), a polyamide, a polyester, or polyvinylidene chloride.

94. The machine direction-oriented polymeric film of any one of clauses 90-93 wherein the oxygen barrier polymer comprises ethylene vinyl alcohol (EVOH).

95. The machine direction-oriented polymeric film of any one of clauses 90-94 wherein each of the first tie layer and the second tie layer independently comprises an anhydride-modified polyethylene or a copolymer thereof.

96. The machine direction-oriented polymeric film of any one of clauses 90-95 further comprising a first compatibilizing layer interposed between the first skin layer and the first tie layer, the first compatibilizing layer comprising a first compatibilizing resin, and a second compatibilizing layer interposed between the second skin layer and the second tie layer, the second compatibilizing layer comprising a second compatibilizing resin, wherein the first compatibilizing resin and the second compatibilizing resin are the same or different.

97. The machine direction-oriented polymeric film of any one of clauses 90-96 wherein each of the first compatibilizing layer and the second compatibilizing layer independently comprises a maleic anhydride-grafted polyethylene.

98. The machine direction-oriented polymeric film of any one of clauses 90-97 wherein each of the first compatibilizing layer and the second compatibilizing layer independently comprises a maleic anhydride-grafted polyethylene and a polymer selected from the group consisting of metallocene linear low density polyethylene (mLLDPE) and high density polyethylene.

99. The machine direction-oriented polymeric film of any one of clauses 90-98 wherein the polyethylene of the second skin layer comprises low density polyethylene, high density polyethylene, linear low density polyethylene, ultra-low density polyethylene, or a combination thereof.

100. The machine direction-oriented polymeric film of any one of clauses 90-99 wherein the polyethylene of the second skin layer comprises high density polyethylene.

101. The machine direction-oriented polymeric film of any one of clauses 90-100 wherein the first skin layer further comprises a nucleating agent.

102. The machine direction-oriented polymeric film of any one of clauses 90-101 wherein the nucleating agent comprises from about 0.1% to about 7% by weight of the first skin layer.

103. The machine direction-oriented polymeric film of any one of clauses 90-102 wherein the nucleating agent comprises a compound having a formula I

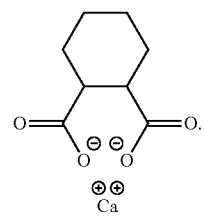

104. The machine direction-oriented polymeric film of any one of clauses 90-103 wherein each of the first skin layer and the second skin layer independently further comprises a nucleating agent.

105. The machine direction-oriented polymeric film of any one of clauses 90-104 wherein the nucleating agent in the first skin layer comprises from about 0.1% to about 7% by weight of the first skin layer, and the nucleating agent in the second skin layer comprises from about 0.1% to about 7% by weight of the second skin layer.

106. The machine direction-oriented polymeric film of any one of clauses 90-105 wherein the strain at break in the machine direction is less than about 50%.

107. The machine direction-oriented polymeric film of any one of clauses 90-106 wherein the strain at break in the machine direction is less than about 30%.

108. The machine direction-oriented polymeric film of any one of clauses 90-107 wherein the 1% secant modulus in the machine direction is greater than about 250,000 pounds per square inch.

109. The machine direction-oriented polymeric film of any one of clauses 90-108 wherein the 1% secant modulus in the machine direction is greater than about 300,000 pounds per square inch.

110. The machine direction-oriented polymeric film of any one of clauses 90-109 wherein the machine direction-oriented polymeric film has a gloss of greater than about 65%.

111. The machine direction-oriented polymeric film of any one of clauses 90-110 wherein the gloss is greater than about 70%.

112. The machine direction-oriented polymeric film of any one of clauses 90-111 wherein the machine-direction-oriented polymeric film has a gloss of greater than about 20%.

113. The machine direction-oriented polymeric film of any one of clauses 90-112 wherein the machine direction-oriented polymeric film has a haze of less than about 10%.

114. The machine direction-oriented polymeric film of any one of clauses 90-113 wherein the haze is less than about 20%.

115. The machine direction-oriented polymeric film of any one of clauses 90-114 wherein the haze is less than about 15%.

116. The machine direction-oriented polymeric film of any one of clauses 90-115 wherein the haze is less than about 10%.

117. The machine direction-oriented polymeric film of any one of clauses 90-116 wherein the haze is less than about 8%.

118. The machine direction-oriented polymeric film of any one of clauses 90-117 wherein the haze is less than about 5%.

119. The machine direction-oriented polymeric film of any one of clauses 90-118 wherein the first skin layer has a melting point that is greater than or equal to about 115° C.

120. The machine direction-oriented polymeric film of any one of clauses 90-119 wherein the first skin layer has a melting point that is greater than or equal to about 127° C.

121. The machine direction-oriented polymeric film of any one of clauses 90-120 wherein the machine direction-oriented polymeric film has a stress at break in the machine direction of greater than about 25,000 pounds per square inch.

122. The machine direction-oriented polymeric film of any one of clauses 90-121 further comprising a first sub-skin layer interposed between the first skin layer and the first compatibilizing layer and a second sub-skin layer interposed between the second skin layer and the second compatibilizing layer.

123. The machine direction-oriented polymeric film of any one of clauses 90-122, wherein each of the first sub-skin layer and the second sub-skin layer independently comprises a maleic anhydride-grafted polyethylene.

124. The machine direction-oriented polymeric film of any one of clauses 90-123 wherein each of the first sub-skin layer and the second sub-skin layer further comprises a polymer selected from the group consisting of metallocene linear low density polyethylene (mLLDPE), high density polyethylene, low density polyethylene, linear low density polyethylene, ultra-low density polyethylene, and a combination thereof.

125. The machine direction-oriented polymeric film of any one of clauses 90-124 wherein each of the first sub-skin layer and the second sub-skin layer further comprises a polymer selected from the group consisting of metallocene linear low density polyethylene (mLLDPE) and high density polyethylene.

126. The machine direction-oriented polymeric film of any one of clauses 90-125 further comprising a first sub-skin layer interposed between the first skin layer and the first compatibilizing layer and a second sub-skin layer interposed between the second skin layer and the second compatibilizing layer, wherein each of the first sub-skin layer and the second sub-skin layer independently comprises a a maleic anhydride-grafted polyethylene and a high density polyethylene.

127. The machine direction-oriented polymeric film of any one of clauses 90-126 wherein the polymeric film has a thickness of less than about 2 mil.

128. The machine direction-oriented polymeric film of any one of clauses 90-127 wherein the polymeric film has a thickness of less than about 1.5 mil.

129. The machine direction-oriented polymeric film of any one of clauses 90-128 wherein the polymeric film has a thickness of less than about 1 mil.

130. A machine direction-oriented polymeric film comprising
a first skin layer comprising polyethylene,
a core layer comprising an oxygen barrier polymer,
a second skin layer comprising polyethylene
a first tie layer interposed between the first skin layer and the core layer, the first tie layer comprising a first tie resin, the first tie resin comprising an anhydride-modified polyethylene or a copolymer thereof,
a second tie layer interposed between the second skin layer and the core layer, the second tie layer comprising a second tie resin, the second tie resin comprising an anhydride-modified polyethylene or a copolymer thereof, wherein the first tie resin and the second tier resin are the same or different,
a first compatibilizing layer interposed between the first skin layer and the first tie layer, the first compatibilizing layer comprising a maleic anhydride-grafted polyethyelene, and
a second compatibilizing layer interposed between the second skin layer and the second tie layer, the second compatibilizing layer comprising a maleic anhydride-grafted polyethyelene,
wherein the machine direction-oriented polymeric film has a strain at break in a machine direction of less than about 100%, and a 1% secant modulus in the machine direction of greater than about 225,000 pounds per square inch.

131. The machine direction-oriented polymeric film of clause 130 wherein the first skin layer comprises medium density polyethylene.

132. The machine direction-oriented polymeric film of clause 130 or clause 131 wherein the first skin layer comprises high density polyethylene.

133. The machine direction-oriented polymeric film of any one of clauses 130-132 wherein the first skin layer comprises linear medium density polyethylene.

134. The machine direction-oriented polymeric film of any one of clauses 130-133 wherein the oxygen barrier polymer comprises ethylene vinyl alcohol (EVOH).

135. The machine direction-oriented polymeric film of any one of clauses 130-134 wherein each of the first tie layer and the second tie layer further comprises metallocene linear low density polyethylene (mLLDPE).

136. The machine direction-oriented polymeric film of any one of clauses 130-135 wherein each of the first compatibilizing layer and the second compatibilizing layer further comprises a polymer selected from the group consisting of metallocene linear low density polyethylene (mLLDPE) and high density polyethylene.

137. The machine direction-oriented polymeric film of any one of clauses 130-136 further comprising a first sub-skin layer interposed between the first skin layer and the first compatibilizing layer and a second sub-skin layer interposed between the second skin layer and the second compatibilizing layer.

138. The machine direction-oriented polymeric film of any one of clauses 130-137, wherein each of the first sub-skin layer and the second sub-skin layer independently comprises a maleic anhydride-grafted polyethylene.

139. The machine direction-oriented polymeric film of any one of clauses 130-138 wherein each of the first sub-skin layer and the second sub-skin layer further comprises a polymer selected from the group consisting of metallocene linear low density polyethylene (mLLDPE) and high density polyethylene.

140. The machine direction-oriented polymeric film of any one of clauses 130-139 wherein each of the first skin layer and the second skin layer independently comprises from about 5% to about 45% by weight of the machine direction-oriented polymeric film, wherein each of the first compatibilizing layer and the second compatibilizing layer comprises from about 3% to about 40% by weight of the machine direction-oriented film, wherein each of the first tie layer and the second tie layer independently comprises from about 3% to about 25% by weight of the machine direction-oriented polymeric film, and wherein the core layer comprises from about 2% to about 80% by weight of the machine direction-oriented polymeric film.

141. The machine direction-oriented polymeric film of any one of clauses 130-140 wherein each of the first skin layer and the second skin layer independently comprises from about 5% to about 45% by weight of the machine direction-oriented polymeric film, wherein each of the first sub-skin layer and the second sub-skin layer comprises from about 5% to about 40% by weight of the machine direction-oriented film, wherein each of the first compatibilizing layer and the second compatibilizing layer comprises from about 3% to about 40% by weight of the machine direction-oriented film, wherein each of the first tie layer and the second tie layer independently comprises from about 3% to about 25% by weight of the machine direction-oriented polymeric film, and wherein the core layer comprises from about 2% to about 80% by weight of the machine direction-oriented polymeric film.

142. The machine direction-oriented polymeric film of any one of clauses 130-141 wherein each of the first skin layer and the second skin layer independently comprises from about 10% to about 30% by weight of the machine direction-oriented polymeric film, wherein each of the first sub-skin layer and the second sub-skin layer independently comprises from about 5% to about 20% by weight of the machine direction-oriented polymeric film, wherein each of the first compatibilizing layer and the second compatibilizing layer comprises from about 3% to about 25% by weight of the machine direction-oriented film, wherein each of the first tie layer and the second tie layer independently comprises from about 3% to about 25% by weight of the machine direction-oriented polymeric film, and wherein the core layer comprises from about 2% to about 80% by weight of the machine direction-oriented polymeric film.

143. A packaging article comprising the machine direction-oriented polymeric film of any one of clauses 1-71 and 90-142 and a sealant web, wherein the machine direction-oriented polymeric film is laminated to the sealant web.

144. The packaging article of clause 143 wherein the packaging article is selected from the group consisting of a stand-up pouch, a pillow pouch, a bag, and a container lidding.

The invention claimed is:

1. A machine direction-oriented polymeric film comprising
a first skin layer comprising polyethylene and a first nucleating agent, wherein the first nucleating agent comprises a compound having formula I

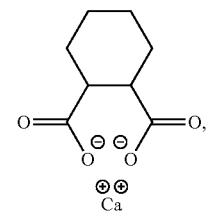

a core layer comprising polyethylene, wherein the core layer does not comprise a nucleating agent, and
a second skin layer comprising polyethylene,
wherein the machine direction-oriented polymeric film has a strain at break in a machine direction of less than about 300%, a 45 degree gloss of greater than about 30%, and a haze of less than about 30%;
wherein the first nucleating agent comprises from about 0.1% to about 7% by weight of the first skin layer; and
wherein the polyethylene of the first skin layer, the polyethylene of the core layer, and the polyethylene of the second skin layer are each independently selected from the group consisting of high density polyethylene, low density polyethylene, linear low density polyethylene, medium density polyethylene, ultra-low density polyethylene, and a combination thereof.

2. The machine direction-oriented polymeric film of claim 1 wherein the polyethylene of the first skin layer comprises high density polyethylene.

3. The machine direction-oriented polymeric film of claim 1 wherein the polyethylene of the first skin layer and the polyethylene of the second skin layer each comprise high density polyethylene.

4. The machine direction-oriented polymeric film of claim 1 wherein the second skin layer further comprises a second nucleating agent.

5. The machine direction-oriented polymeric film of claim 1 wherein the strain at break in the machine direction is less than about 250%.

6. The machine direction-oriented polymeric film of claim 1 wherein the strain at break in the machine direction is less than about 200%.

7. The machine direction-oriented polymeric film of claim 1 wherein the strain at break in the machine direction is less than about 100%.

8. The machine direction-oriented polymeric film of claim 1 wherein the strain at break in the machine direction is less than about 60%.

9. The machine direction-oriented polymeric film of claim 1 wherein the machine direction-oriented polymeric film has a 45 degree gloss of greater than about 40%.

10. The machine direction-oriented polymeric film of claim 1 wherein the machine direction-oriented polymeric film has a 45 degree gloss of between about 60% and about 85%.

11. The machine direction-oriented polymeric film of claim 1 wherein the haze is less than about 20%.

12. The machine direction-oriented polymeric film of claim 1 wherein the haze is between about 3% and about 21%.

13. The machine direction-oriented polymeric film of claim 1 wherein the haze is between about 3% and about 6%.

14. The machine direction-oriented polymeric film of claim 1 wherein the polymeric film has a thickness of less than about 2 mil.

15. A machine direction-oriented polymeric film comprising
a first skin layer comprising (a) high density polyethylene, medium density polyethylene, linear medium density polyethylene, or a combination thereof, and (b) a first nucleating agent, wherein the first nucleating agent comprises a compound having formula I

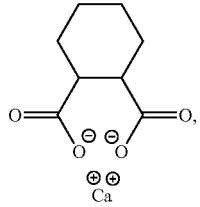

a core layer comprising polyethylene, wherein the core layer does not comprise a nucleating agent,
a first sub-skin layer interposed between the first skin layer and the core layer, the first sub-skin layer comprising polyethylene,
a second skin layer comprising polyethylene, and
a second sub-skin layer interposed between the second skin layer and the core layer, the second sub-skin layer comprising polyethylene,
wherein the machine direction-oriented polymeric film has a strain at break in a machine direction of less than about 300%, a 45 degree gloss of between about 60% and 85%, and a haze of between about 3% and 21%;
wherein the first nucleating agent comprises from about 0.1% to about 7% by weight of the first skin layer and wherein the polyethylene of the core layer and the polyethylene of the second skin layer are each independently selected from the group consisting of high density polyethylene, low density polyethylene, linear low density polyethylene, medium density polyethylene, ultra-low density polyethylene, and a combination thereof.

16. A machine direction-oriented polymeric film comprising
a first skin layer comprising high density polyethylene and a first nucleating agent, wherein the first nucleating agent comprises a compound having formula I

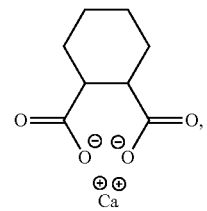

a core layer comprising polyethylene, wherein the core layer does not comprise a nucleating agent,
a first sub-skin layer interposed between the first skin layer and the core layer, the first sub-skin layer comprising metallocene linear medium density polyethylene,
a second skin layer comprising high density polyethylene, and
a second sub-skin layer interposed between the second skin layer and the core layer, the second sub-skin layer comprising metallocene linear medium density polyethylene,
wherein each of the first skin layer and the second skin layer independently comprises from about 5% to about 45% by weight of the machine direction-oriented polymeric film,
wherein each of the first sub-skin layer and the second sub-skin layer independent comprises from about 3% to about 25% by weight of the machine direction-oriented polymeric film,
wherein the core layer comprises from about 10% to about 80% by weight of the machine direction-oriented polymeric film,
wherein the machine direction-oriented polymeric film has a strain at break in a machine direction of less than about 150%, a 45 degree gloss of between about 60% and 85%, and a haze of between about 3% and 21%, and
wherein the machine direction-oriented polymeric film has a thickness of less than about 1.0 mil.

17. The machine direction-oriented polymeric film of claim 16 wherein the second skin layer further comprises a second nucleating agent, and wherein the first nucleating agent and the second nucleating agent are the same.

18. A machine direction-oriented polymeric film comprising
a first skin layer comprising polyethylene and a first nucleating agent, wherein the first nucleating agent comprises a compound having formula I

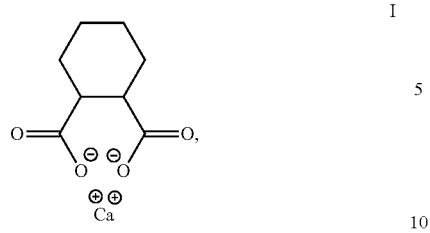

a core layer comprising polyethylene, wherein the core layer does not comprise a nucleating agent, and a second skin layer comprising polyethylene, wherein the machine direction-oriented polymeric film has a strain at break in a machine direction of less than about 300%, a 45 degree gloss of greater than about 30%, and a haze of less than about 30%;

wherein the polyethylene of the first skin layer, the polyethylene of the core layer, and the polyethylene of the second skin layer are each independently selected from the group consisting of high density polyethylene, low density polyethylene, linear low density polyethylene, medium density polyethylene, ultra-low density polyethylene, and a combination thereof.

* * * * *